(12) United States Patent
Takei

(10) Patent No.: US 8,520,321 B2
(45) Date of Patent: Aug. 27, 2013

(54) IMAGING LENS AND IMAGING DEVICE

(75) Inventor: Shoji Takei, Kanagawa (JP)

(73) Assignee: Sony Corporation, Tokyo (JP)

( * ) Notice: Subject to any disclaimer, the term of this patent is extended or adjusted under 35 U.S.C. 154(b) by 110 days.

(21) Appl. No.: 13/137,397

(22) Filed: Aug. 11, 2011

(65) Prior Publication Data

US 2012/0075723 A1  Mar. 29, 2012

(30) Foreign Application Priority Data

Sep. 29, 2010 (JP) .................................. 2010-219962

(51) Int. Cl.
*G02B 3/02* (2006.01)

(52) U.S. Cl.
USPC ........................................................ 359/715

(58) Field of Classification Search
USPC .................................. 351/642, 708, 713–715
See application file for complete search history.

(56) References Cited

U.S. PATENT DOCUMENTS

| | | | | |
|---|---|---|---|---|
| 2007/0008625 A1* | 1/2007 | Park et al. | ..................... | 359/642 |
| 2010/0172024 A1 | 7/2010 | Sakagami | | |

FOREIGN PATENT DOCUMENTS

| | | |
|---|---|---|
| EP | 2 157 465 A1 | 2/2010 |
| JP | 2007-286153 | 11/2007 |
| JP | 2009-069193 | 4/2009 |
| JP | 2009-122634 | 6/2009 |
| JP | 2009-288377 | 12/2009 |
| JP | 2010-102162 | 5/2010 |

OTHER PUBLICATIONS

Extended European Search report issued Feb. 12, 2012 for corresponding European Patent No. 11 17 8254.

* cited by examiner

*Primary Examiner* — James Greece
(74) *Attorney, Agent, or Firm* — Rader, Fishman & Grauer PLLC

(57) ABSTRACT

An imaging lens includes an aperture stop, a first lens having positive refractive power, a second lens having negative refractive power, a third lens having positive refractive power, and a fourth lens having negative refractive power. Both surfaces of the first lens, both surfaces of the second lens, both surfaces of the third lens, and both surfaces of the fourth lens are formed as aspheric surfaces. The following condition expression (1), condition expression (2), and condition expression (3) are satisfied.

$$-1.09 \leq f2/f \leq -0.81 \quad (1)$$

$$-1.62 \leq f2/f1 \leq -1.42 \quad (2)$$

$$0.65 \leq f3/f \leq 0.97 \quad (3)$$

in which
f1: the focal length of the first lens
f2: the focal length of the second lens
f3: the focal length of the third lens
f: the focal length of the lens whole system.

5 Claims, 13 Drawing Sheets

2 ··· IMAGING LENS
G1 ··· FIRST LENS
G2 ··· SECOND LENS
G3 ··· THIRD LENS
G4 ··· FOURTH LENS
ST0 ··· APERTURE STOP

2 ··· IMAGING LENS
G1 ··· FIRST LENS
G2 ··· SECOND LENS
G3 ··· THIRD LENS
G4 ··· FOURTH LENS
ST0 ··· APERTURE STOP

5 ··· IMAGING LENS
G1 ··· FIRST LENS
G2 ··· SECOND LENS
G3 ··· THIRD LENS
G4 ··· FOURTH LENS
ST0 ··· APERTURE STOP

10 ··· CELLULAR PHONE (IMAGING DEVICE)

10 ··· CELLULAR PHONE (IMAGING DEVICE)

IMAGING LENS AND IMAGING DEVICE

BACKGROUND

The present disclosure relates to imaging lenses and imaging devices. Specifically, the present disclosure relates to technical fields of an imaging lens that ensures a small F-number in addition to a high resolution and shortening of the optical total length, and an imaging device including the imaging lens.

In recent years, pieces of portable apparatus such as cellular phones have been spread. A camera function is incorporated into many of these pieces of portable apparatus and demands for higher performance of the incorporated camera function are high. Regarding such portable apparatus, particularly demands for a high resolution and shortening of the optical total length of the imaging lens (camera module lens) for achievement of the smaller thickness of the apparatus are high.

As the imaging lens incorporated into the portable apparatus, there is e.g. an imaging lens of a four-lens configuration type formed by disposing four lenses sequentially from the object side toward the image side. As the imaging lens of such a four-lens configuration type, imaging lenses that achieve a high resolution and shortening of the optical total length with brightness equivalent to about 2.8 of the F-number have been proposed as the related art.

These imaging lenses of the related art are disclosed in e.g. Japanese Patent Laid-open No. 2007-286153, No. 2009-69193, No. 2009-122634, No. 2009-288377, and No. 2010-102162 (hereinafter, Patent Documents 1 to 5, respectively).

SUMMARY

The imaging lens that ensures a high resolution in addition to the bright optical system has many advantages in terms of photographing. Thus, in recent years, particularly demands for such an imaging lens having many advantages in terms of photographing are increasing.

However, in the case of the imaging lenses disclosed in the above-mentioned Patent Documents 1 to 5, the F-number is about 2.8 although a high resolution and shortening of the optical total length are achieved. Therefore, it is hard to say that these imaging lenses sufficiently satisfy the users' demands.

There is a need for a technique to provided an imaging lens and an imaging device that ensure a small F-number in addition to a high resolution and shortening of the optical total length.

According to an embodiment of the present disclosure, there is provided an imaging lens including an aperture stop, a first lens configured to have positive refractive power, and a second lens configured to have negative refractive power. The surfaces of the second lens near the optical axis have a bi-concave shape. The imaging lens further includes a third lens configured to have positive refractive power. The object-side surface of the third lens near the optical axis is concave toward the object side. The imaging lens further includes a fourth lens configured to have negative refractive power. The object-side surface of the fourth lens near the optical axis is convex toward the object side. The aperture stop, the first lens, the second lens, the third lens, and the fourth lens are sequentially disposed from the object side toward the image side. Both surfaces of the first lens, both surfaces of the second lens, both surfaces of the third lens, and both surfaces of the fourth lens are formed as aspheric surfaces. The following condition expression (1), condition expression (2), and condition expression (3) are satisfied.

$$-1.09 \leq f2/f \leq -0.81 \tag{1}$$

$$-1.62 \leq f2/f1 \leq -1.42 \tag{2}$$

$$0.65 \leq f3/f \leq 0.97 \tag{3}$$

in which
f1: the focal length of the first lens
f2: the focal length of the second lens
f3: the focal length of the third lens
f: the focal length of the lens whole system Therefore, in the imaging lens, distribution of the focal length among the first lens having positive refractive power, the second lens having negative refractive power, and the third lens having positive refractive power is properly achieved.

In the above-described imaging lens, it is preferable that the following condition expression (4) be satisfied.

$$0.68 \leq R4/f \leq 0.90 \tag{4}$$

in which
R4: the radius of curvature of the image-side surface of the second lens If the imaging lens satisfies condition expression (4), the refractive power of the second lens is rendered proper.

In the above-described imaging lens, it is preferable that the following condition expression (5) be satisfied.

$$L/Y \leq 1.58 \tag{5}$$

in which
L: the distance from the vertex of the object-side surface of the first lens to the image plane
Y: the image height If the imaging lens satisfies condition expression (5), the distance from the vertex of the object-side surface of the first lens to the image plane does not become too long relative to the image height.

In the above-described imaging lens, it is preferable that the value of the F-number be set equal to or smaller than 2.47.

By setting the value of the F-number equal to or smaller than 2.47, a bright optical system is realized.

According to another embodiment of the present disclosure, there is provided an imaging device including an imaging lens and an imaging element configured to convert an optical image formed by the imaging lens to an electrical signal. The imaging lens includes an aperture stop, a first lens having positive refractive power, and a second lens having negative refractive power. The surfaces of the second lens near the optical axis have a bi-concave shape. The imaging lens further includes a third lens having positive refractive power. The object-side surface of the third lens near the optical axis is concave toward the object side. The imaging lens further includes a fourth lens having negative refractive power. The object-side surface of the fourth lens near the optical axis is convex toward the object side. The aperture stop, the first lens, the second lens, the third lens, and the fourth lens are sequentially disposed from the object side toward the image side. Both surfaces of the first lens, both surfaces of the second lens, both surfaces of the third lens, and both surfaces of the fourth lens are formed as aspheric surfaces. The following condition expression (1), condition expression (2), and condition expression (3) are satisfied.

$$-1.09 \leq f2/f \leq -0.81 \tag{1}$$

$$-1.62 \leq f2/f1 \leq -1.42 \tag{2}$$

$$0.65 \leq f3/f \leq 0.97 \tag{3}$$

in which f1: the focal length of the first lens
f2: the focal length of the second lens
f3: the focal length of the third lens
f: the focal length of the lens whole system Therefore, in the imaging device, distribution of the focal length among the first lens having positive refractive power, the second lens having negative refractive power, and the third lens having positive refractive power is properly achieved.

The imaging lens and the imaging device according to the embodiments of the present disclosure can ensure a small F-number in addition to a high resolution and shortening of the optical total length. In particular, a bright imaging optical system in which the value of the F-number is equal to or smaller than 2.47 can be ensured.

DETAILED DESCRIPTION OF THE PREFERRED EMBODIMENTS

Figure 1:
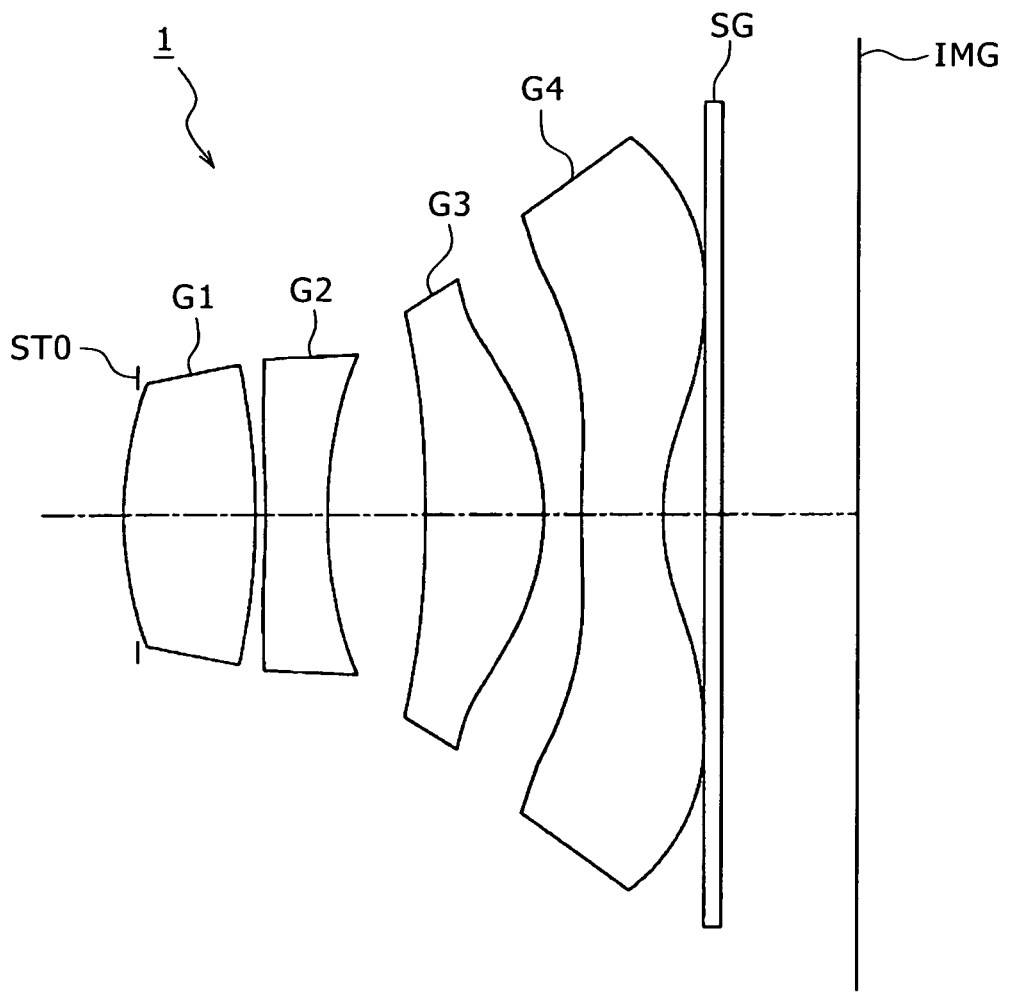
FIG. 1 is a diagram showing the lens configuration of an imaging lens according to a first embodiment of the present disclosure.

Imaging lenses and imaging devices according to best modes for carrying out the present disclosure will be described below.

[Configuration of Imaging Lens]

The imaging lens according to an embodiment of the present disclosure is formed by disposing an aperture stop, a first lens, a second lens, a third lens, and a fourth lens sequentially from the object side toward the image side. The first lens has positive refractive power. The second lens has negative refractive power and the surfaces of the second lens near the optical axis have a bi-concave shape. The third lens has positive refractive power and the object-side surface of the third lens near the optical axis is concave toward the object side. The fourth lens has negative refractive power and the object-side surface of the fourth lens near the optical axis is convex toward the object side.

Furthermore, in the imaging lens according to an embodiment of the present disclosure, both surfaces of the first lens, both surfaces of the second lens, both surfaces of the third lens, and both surfaces of the fourth lens are formed as aspheric surfaces.

Moreover, the imaging lens according to an embodiment of the present disclosure satisfies the following condition expression (1), condition expression (2), and condition expression (3).

$$-1.09 \leq f2/f \leq -0.81 \quad (1)$$

$$-1.62 \leq f2/f1 \leq -1.42 \quad (2)$$

$$0.65 \leq f3/f \leq 0.97 \quad (3)$$

In these expressions, the parameters are defined as follows.

f1: the focal length of the first lens
f2: the focal length of the second lens
f3: the focal length of the third lens
f: the focal length of the lens whole system Condition expression (1) is an expression that defines the ratio of the focal length of the second lens having negative refractive power to the focal length of the lens whole system.

If this ratio surpasses the upper limit of condition expression (1), the Petzval sum becomes too small and the image plane tilts toward the under-corrected side excessively.

Conversely, if this ratio is under the lower limit of condition expression (1), the Petzval sum becomes too large and the image plane tilts toward the over-corrected side excessively.

Condition expression (2) is an expression that defines the ratio of the focal length of the second lens having negative refractive power to the focal length of the first lens having positive refractive power.

If this ratio is under the lower limit of condition expression (2), correction of the axial chromatic aberration becomes excessive and the distortion increases. Furthermore, the image plane in the sagittal/tangential direction becomes too under-corrected.

Conversely, if this ratio surpasses the upper limit of condition expression (2), correction of the axial chromatic aberration becomes insufficient and the lowering of the resolution is caused.

If the imaging lens satisfies condition expression (1) and condition expression (2), distribution of the focal length between the first lens having positive refractive power and the second lens having negative refractive power is properly achieved. Therefore, the axial chromatic aberration and the spherical aberration can be favorably corrected. Due to the favorable correction of the axial chromatic aberration and the spherical aberration, a high resolution can be ensured in the range to the high-frequency region even when the F-number is set small.

Condition expression (3) is an expression that defines the ratio of the focal length of the third lens having positive refractive power to the focal length of the lens whole system.

If this ratio is under the lower limit of condition expression (3), the Petzval sum becomes too small and the image plane tilts toward the under-corrected side excessively.

Conversely, if this ratio surpasses the upper limit of condition expression (3), the Petzval sum becomes too large and the image plane tilts toward the over-corrected side excessively.

If the imaging lens satisfies condition expression (1), condition expression (2), and condition expression (3), distribution of the focal length among the first lens having positive refractive power, the second lens having negative refractive power, and the third lens having positive refractive power is properly achieved. Therefore, the spherical aberration and the curvature of field can be favorably corrected, and the image plane in the sagittal/tangential direction can be properly corrected.

It is also possible to set the F-number to about 2.4 by widening the aperture (diameter of the aperture stop) in an imaging optical system with about 2.8 of the F-number. However, in this case, it is difficult to ensure a high resolution due to the influence of the residual aberration. Furthermore, if the aperture is widened, correction of the astigmatism and the curvature of field in the peripheral area of the lens becomes insufficient. In particular, if correction of the astigmatism is insufficient, the effect of so-called aperture control, in which the resolution is adjusted by image processing, differs between the tangential direction and the sagittal direction. Thus, the image becomes unnatural and the deterioration of the image quality is caused.

So, it will also be effective to carry out aberration correction by forming an appropriate surface of the lens as an aspheric surface. However, if aberration correction is attempted by only the aspheric surface, possibly difficulty in molding of the lens becomes higher and the mass-productivity is lowered due to increase in the sensitivity to assembly and strain of the lens.

In contrast, the imaging lens according to an embodiment of the present disclosure has design made in consideration of the manufacturability and the mass-productivity through optimization of distribution of the focal length among the respective constituent lenses and the way of use of the aspheric coefficient.

As described above, the imaging lens according to an embodiment of the present disclosure satisfies condition expression (1), condition expression (2), and condition expression (3), and therefore distribution of the focal length among the first lens having positive refractive power, the second lens having negative refractive power, and the third lens having positive refractive power is properly achieved.

Accordingly, the axial chromatic aberration, the spherical aberration, and the curvature of field are favorably corrected, and a bright, high-resolution imaging lens with achievement of a wider angle of view can be realized.

Specifically, the imaging lens has about 2.4 of the F-number and a wide angle of view equivalent to 28 mm in 35 mm equivalent, and high resolution performance is ensured in the range to the peripheral area of the lens. For example, a sufficiently-high resolution for use as the lens of a camera of portable apparatus with 8 to 13 million pixels is ensured.

In addition, as described above, the imaging lens according to an embodiment of the present disclosure achieves both of shortening of the optical total length and brightness and increase in the resolution.

Specifically, the optical total length is set to about 4.5 mm for an imaging element having a 1/3.2 size.

In general, in shortening of the optical total length, the following problems exist regarding the manufacturability and the mass-productivity.

For example, in the case of attempting to shorten the optical total length through only shortening of the lens thickness and the air gap between lenses, possibly the required shortening of the optical total length cannot be achieved because there are limits to the moldability of the lens and the accuracy of processing of the barrel to hold the lens.

Furthermore, in the case of attempting to shorten the optical total length by shortening the back focal length, possibly dust, flaw, etc. are imaged in the image and are noticeable. In addition, a cover glass and an infrared cut filter are disposed between the imaging element and the lens. Therefore, there is a limit also to the shortening of the optical total length through the shortening of the back focal length.

Moreover, for example in the case of attempting to shorten the optical total length with such a wide angle of view that the converted focal length is equivalent to 28 mm, the sectional area of a beam at a peripheral angle of view becomes small due to the cosine fourth law and vignetting. Therefore, possibly the dust imaged in the image has such a large size as to be noticeable and the size of the dust becomes the uncontrollable level.

In order to avoid the occurrence of the above-described problems, the imaging lens according to an embodiment of the present disclosure is designed in consideration of sufficiently-high manufacturability and mass-productivity and achieves both of shortening of the optical total length and brightness and increase in the resolution.

It is preferable to satisfy the following condition expression (4) in the imaging lens according to one embodiment of the present disclosure.

$$0.68 \leq R4/f \leq 0.90 \tag{4}$$

In this expression, R4 is defined as follows.

R4: the radius of curvature of the image-side surface of the second lens

Condition expression (4) is an expression that shows the ratio of the radius of curvature of the image-side surface of the second lens to the focal length of the lens whole system.

If this ratio is under the lower limit of condition expression (4), the refractive power of the second lens becomes too strong and the image plane tilts toward the over-corrected side excessively.

Conversely, if this ratio surpasses the upper limit of condition expression (4), the refractive power of the second lens becomes too weak and the image plane tilts toward the under-corrected side excessively.

Therefore, if the imaging lens satisfies condition expression (4), the refractive power of the second lens is rendered proper and the curvature of field, the spherical aberration, and the coma aberration can be favorably corrected.

It is preferable to satisfy the following condition expression (5) in the imaging lens according to one embodiment of the present disclosure.

$$L/Y \leq 1.58 \tag{5}$$

In this expression, the parameters are defined as follows.

L: the distance from the vertex of the object-side surface of the first lens to the image plane Y: the image height Condition expression (5) is an expression that defines the ratio of the distance from the vertex of the object-side surface of the first lens to the image plane to the image height. The image height shows the distance between the optical axis and the image point in the image plane and is represented as half of the diagonal length of the imaging element.

If this ratio surpasses the upper limit of condition expression (5), the distance from the vertex of the object-side surface of the first lens to the image plane becomes too long relative to the image height and it becomes difficult to achieve shortening of the optical total length with ensuring of a high resolution.

Therefore, if the imaging lens satisfies condition expression (5), shortening of the optical total length can be achieved with ensuring of a high resolution.

It is preferable that the value of the F-number be set equal to or smaller than 2.47 in the imaging lens according to one embodiment of the present disclosure.

By setting the value of the F-number equal to or smaller than 2.47, a bright optical system can be realized with ensuring of a high resolution and shortening of the optical total length.

[Numeric Value Working Examples of Imaging Lens]

Regarding the imaging lens, specific embodiments and numeric value working examples in which specific numeric values are applied to the embodiments will be described below with reference to the drawings and tables.

The meaning and so forth of symbols shown in the following respective tables and description is as follows.

"Surface number Si" shows the i-th surface, counting from the object side toward the image side. "Radius of curvature Ri" shows the radius of curvature of the i-th surface. "Distance Di" shows the axial surface distance (thickness of the lens center or air distance) between the i-th surface and the i+1-th surface. "Refractive index Ndi" shows the refractive index of the lens or so forth starting from the i-th surface regarding d-ray ($\lambda$=587.6 nm). "vdi" shows the Abbe number of the lens or so forth starting from the i-th surface regarding d-ray.

Regarding "surface number Si," "STO" shows the aperture stop. Regarding "radius of curvature Ri," "$\infty$" shows that this surface is a flat surface. As "surface number Si," numbers starting from "0" are given sequentially from the object side.

"K" shows the conic constant. "A3," "A4," ... show third, fourth, ... aspheric coefficients.

In the following respective tables showing the aspheric coefficients, "E-n" represents an exponential expression with 10 as the base, i.e. "minus n-th power of 10." For example, "0.12345E-05" represents "0.12345×(minus fifth power of 10)."

The imaging lenses used in the respective embodiments include lenses having a lens surface formed as an aspheric surface. The aspheric shape is defined by the following Expression 1 if the depth of the aspheric surface is defined as "Z," the height from the optical axis is defined as "Y," the radius of curvature is defined as "R," the conic constant is defined as "K," and the i-th order (i is an integer equal to or larger than 3) aspheric coefficient is defined as "Ai."

$$Z = \frac{Y^2/R}{1+\sqrt{1-(1+K)(Y/R)^2}} + \sum A_i \cdot Y^i \quad \text{[Expression 1]}$$

<First Embodiment>

FIG. 1 shows the lens configuration of an imaging lens 1 in a first embodiment of the present disclosure.

The imaging lens 1 is formed by disposing an aperture stop STO, a first lens G1 having positive refractive power, a second lens G2 having negative refractive power, a third lens G3 having positive refractive power, and a fourth lens G4 having negative refractive power in that order from the object side toward the image side.

The surfaces of the first lens G1 near the optical axis are formed into a bi-convex shape. The first lens G1 is formed of e.g. a resin material or a glass material having a refractive index equal to or higher than 1.5 and an Abbe number equal to or larger than 56.

The surfaces of the second lens G2 near the optical axis are formed into a bi-concave shape. The second lens G2 is formed of e.g. a resin material or a glass material having a refractive index equal to or higher than 1.6 and an Abbe number equal to or smaller than 26. Furthermore, the radius of curvature of the image-side surface is set smaller than the radius of curvature of the object-side surface.

The surfaces of the third lens G3 near the optical axis are so formed as to be concave toward the object side and convex toward the image side. The third lens G3 is formed of e.g. a resin material having a refractive index equal to or higher than 1.5 and an Abbe number equal to or larger than 56, and has an inflection point in the effective diameter of the image-side surface.

The surfaces of the fourth lens G4 near the optical axis are so formed as to be convex toward the object side and concave toward the image side. The fourth lens G4 is formed of e.g. a resin material having a refractive index equal to or higher than 1.5 and an Abbe number equal to or larger than 56, and has an inflection point in each of the effective diameter of the object-side surface and the effective diameter of the image-side surface.

A seal glass SG is disposed between the fourth lens G4 and an image plane IMG.

Lens data of numeric value working example 1 in which specific numeric values are applied to the imaging lens 1 of the first embodiment are shown in Table 1.

TABLE 1

Numeric value working example 1

| Si Surface number | Ri Radius of curvature | Di Distance | Ndi Refractive index | vdi Abbe number |
|---|---|---|---|---|
| 0 (STO) | — | −0.1 | | |
| 1 | 2.00231 | 0.835 | 1.535 | 56.3 |
| 2 | −3.79955 | 0.046 | | |
| 3 | −14.62650 | 0.399 | 1.614 | 25.6 |
| 4 | 2.93532 | 0.605 | | |
| 5 | −4.74116 | 0.745 | 1.535 | 56.3 |
| 6 | −1.07515 | 0.229 | | |
| 7 | 7.36567 | 0.516 | 1.535 | 56.3 |
| 8 | 1.02437 | 0.265 | | |
| 9 | $\infty$ | 0.1 | 1.52 | 64.2 |
| 10 | $\infty$ | 0.869 | | |

In the imaging lens 1, aspheric surfaces are formed as both surfaces of the first lens G1 (first surface, second surface), both surfaces of the second lens G2 (third surface, fourth surface), both surfaces of the third lens G3 (fifth surface, sixth surface), and both surfaces of the fourth lens G4 (seventh surface, eighth surface). The aspheric coefficients of the aspheric surfaces in numeric value working example 1 are shown in Table 2 together with the conic constant K.

TABLE 2

Numeric value working example 1

| Aspheric coefficient | Surface number | |
|---|---|---|
| | First surface | Second surface |
| K | 3.36685E-01 | 2.38680E-01 |
| A4 | -2.08070E-02 | -1.74830E-02 |
| A6 | -3.95410E-02 | 1.88500E-02 |
| A8 | 4.40120E-02 | 3.85660E-02 |
| A10 | -5.87590E-02 | -6.35910E-02 |
| A12 | 1.83390E-02 | 1.17040E-02 |
| A16 | — | 9.58800E-03 |
| A18 | — | -9.11900E-03 |

| Aspheric coefficient | Surface number | | |
|---|---|---|---|
| | Third surface | Fourth surface | Fifth surface |
| K | -5.28891E+00 | -8.25023E-01 | 9.71101E-01 |
| A3 | 3.96700E-03 | 9.66100E-03 | 5.74100E-03 |
| A4 | -2.39640E-02 | -1.97780E-02 | 6.53610E-02 |
| A5 | -1.48000E-04 | 5.43220E-02 | -6.77180E-02 |
| A6 | 1.80160E-02 | -2.55930E-02 | 1.34740E-02 |
| A7 | 4.46610E-02 | -3.34430E-02 | 8.22600E-03 |
| A8 | 7.03580E-02 | 4.61070E-02 | -6.12000E-04 |
| A9 | -5.85810E-02 | 3.42570E-02 | 2.21500E-03 |
| A10 | -1.65420E-02 | -2.68030E-02 | -4.57400E-03 |

| Aspheric coefficient | Surface number | | |
|---|---|---|---|
| | Sixth surface | Seventh surface | Eighth surface |
| K | -3.66468E+00 | -1.00000E+01 | -6.36825E+00 |
| A3 | -3.08800E-03 | -3.10810E-02 | 5.76520E-02 |
| A4 | -6.23500E-02 | -1.63997E-01 | -2.37382E-01 |
| A5 | 8.78610E-02 | 7.08420E-02 | 1.68737E-01 |
| A6 | -1.20656E-01 | -1.25040E-02 | -4.17280E-02 |
| A7 | 6.95250E-02 | 1.58740E-02 | -1.07080E-02 |
| A8 | -1.65900E-03 | 4.29000E-04 | 8.47400E-03 |
| A9 | 1.23210E-02 | -5.02800E-03 | -1.66200E-03 |
| A10 | -9.63000E-03 | 1.16500E-03 | 6.70000E-05 |

Figure 2:
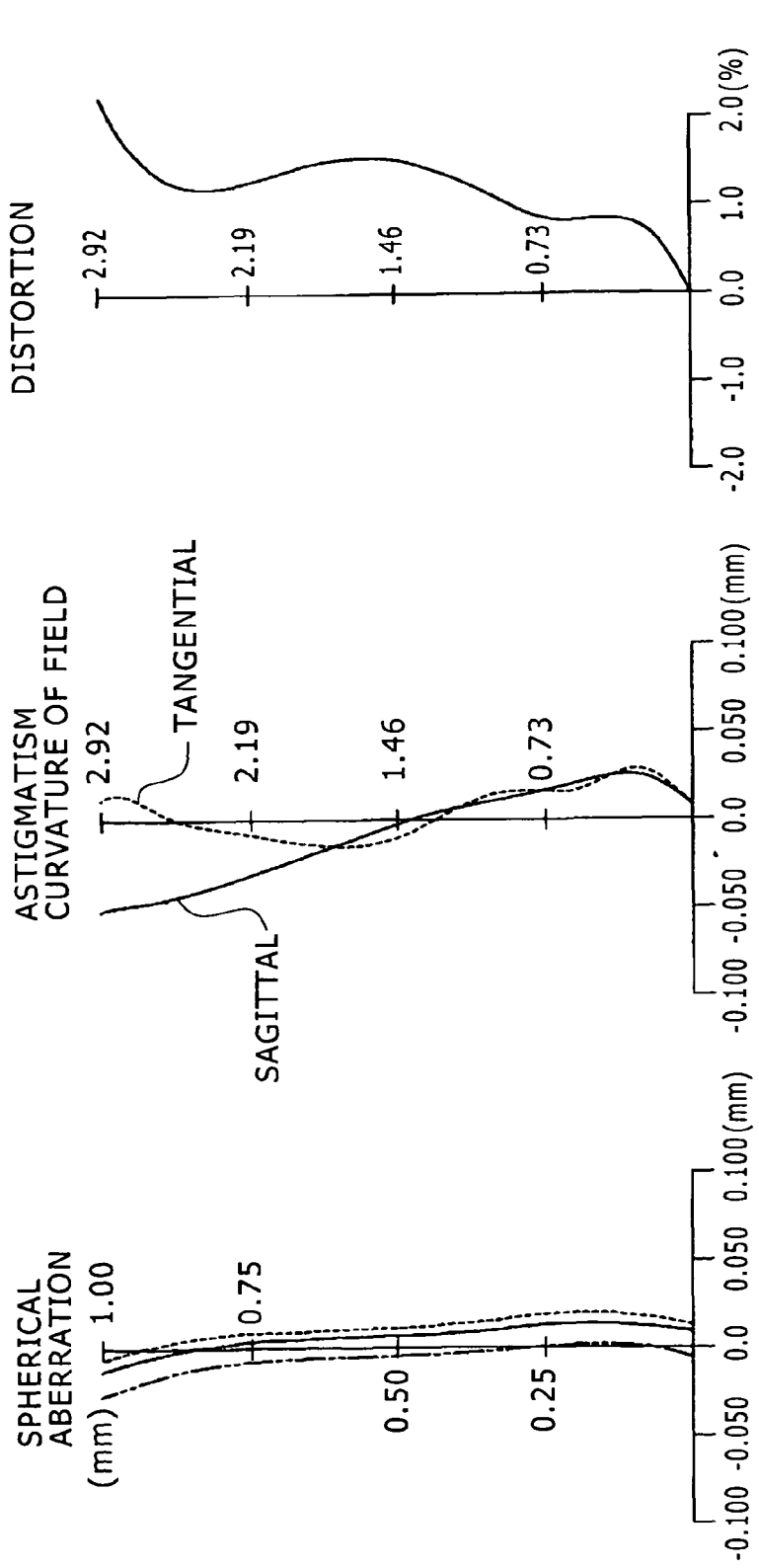
FIG. 2 is a diagram showing spherical aberration, astigmatism, and distortion of a numeric value working example in which specific numeric values are applied to the first embodiment.

FIG. 2 shows a spherical aberration diagram, an astigmatism diagram, and a distortion diagram of numeric value working example 1.

Referring to FIG. 2, in the spherical aberration diagram, the values regarding g-ray (wavelength is 435.8400 nm), d-ray (wavelength is 587.5600 nm), and c-ray (wavelength is 656.2700 nm) are indicated by the two-dot chain line, the solid line, and the dotted line, respectively. In the astigmatism diagram, the value in the sagittal image plane is indicated by the solid line and the value in the meridional image plane is indicated by the dotted line.

From the respective aberration diagrams, it is apparent that numeric value working example 1 achieves favorable correction of the respective aberrations and has excellent image forming performance.

<Second Embodiment>

Figure 3:
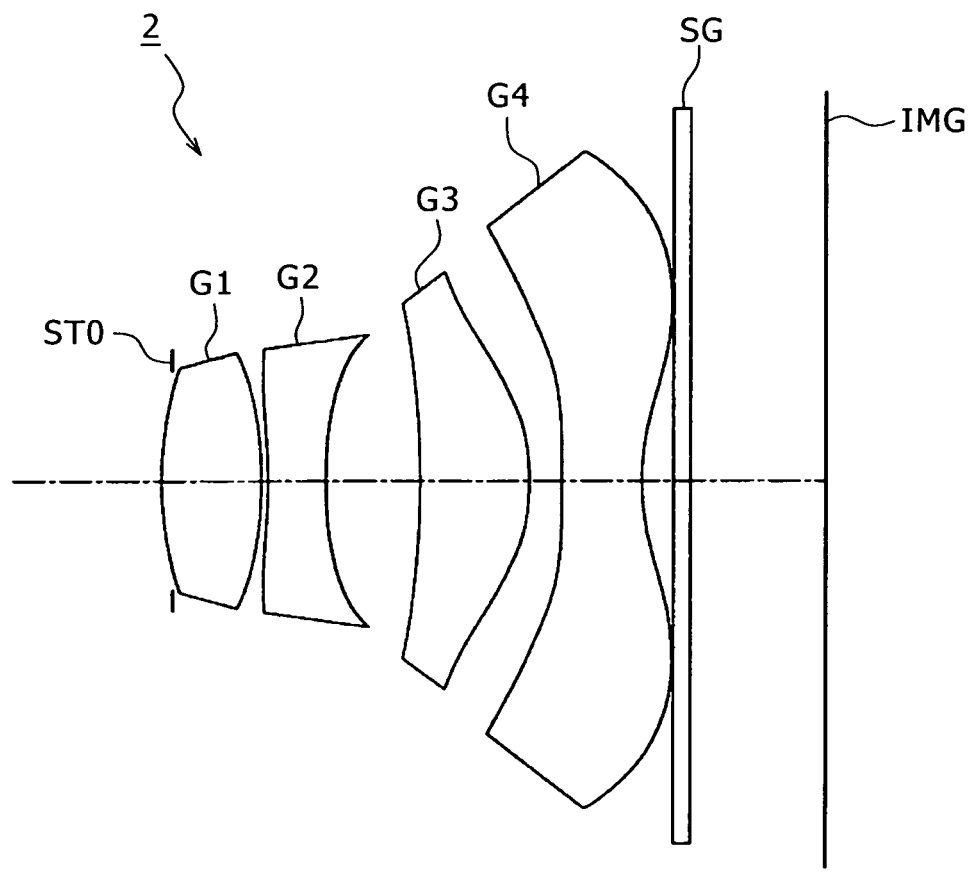
FIG. 3 is a diagram showing the lens configuration of an imaging lens according to a second embodiment of the present disclosure.

FIG. 3 shows the lens configuration of an imaging lens 2 in a second embodiment of the present disclosure.

The imaging lens 2 is formed by disposing an aperture stop STO, a first lens G1 having positive refractive power, a second lens G2 having negative refractive power, a third lens G3 having positive refractive power, and a fourth lens G4 having negative refractive power in that order from the object side toward the image side.

The surfaces of the first lens G1 near the optical axis are formed into a bi-convex shape. The first lens G1 is formed of e.g. a resin material or a glass material having a refractive index equal to or higher than 1.5 and an Abbe number equal to or larger than 56.

The surfaces of the second lens G2 near the optical axis are formed into a bi-concave shape. The second lens G2 is formed of e.g. a resin material or a glass material having a refractive index equal to or higher than 1.6 and an Abbe number equal to or smaller than 26. Furthermore, the radius of curvature of the image-side surface is set smaller than the radius of curvature of the object-side surface.

The surfaces of the third lens G3 near the optical axis are so formed as to be concave toward the object side and convex toward the image side. The third lens G3 is formed of e.g. a resin material having a refractive index equal to or higher than 1.5 and an Abbe number equal to or larger than 56, and has an inflection point in the effective diameter of the image-side surface.

The surfaces of the fourth lens G4 near the optical axis are so formed as to be convex toward the object side and concave toward the image side. The fourth lens G4 is formed of e.g. a resin material having a refractive index equal to or higher than 1.5 and an Abbe number equal to or larger than 56, and has an inflection point in each of the effective diameter of the object-side surface and the effective diameter of the image-side surface.

A seal glass SG is disposed between the fourth lens G4 and an image plane IMG.

Lens data of numeric value working example 2 in which specific numeric values are applied to the imaging lens 2 of the second embodiment are shown in Table 3.

TABLE 3

Numeric value working example 2

| Si Surface number | Ri Radius of curvature | Di Distance | Ndi Refractive index | vdi Abbe number |
|---|---|---|---|---|
| 0 (STO) | — | -0.1 | | |
| 1 | 1.91786 | 0.693 | 1.535 | 56.3 |
| 2 | -3.01622 | 0.040 | | |
| 3 | -11.26410 | 0.415 | 1.614 | 25.6 |
| 4 | 2.59111 | 0.637 | | |
| 5 | -4.85985 | 0.750 | 1.535 | 56.3 |
| 6 | -1.06398 | 0.218 | | |
| 7 | 24.60156 | 0.543 | 1.535 | 56.3 |
| 8 | 1.07022 | 0.240 | | |
| 9 | ∞ | 0.1 | 1.52 | 64.2 |
| 10 | ∞ | 0.869 | | |

In the imaging lens 2, aspheric surfaces are formed as both surfaces of the first lens G1 (first surface, second surface), both surfaces of the second lens G2 (third surface, fourth surface), both surfaces of the third lens G3 (fifth surface, sixth surface), and both surfaces of the fourth lens G4 (seventh surface, eighth surface). The aspheric coefficients of the aspheric surfaces in numeric value working example 2 are shown in Table 4 together with the conic constant K.

TABLE 4

Numeric value working example 2

| Aspheric coefficient | Surface number | |
|---|---|---|
| | First surface | Second surface |
| K | -2.03311E-01 | 3.98575E+00 |
| A4 | -3.11730E-02 | -3.75060E-02 |
| A6 | -5.46540E-02 | 2.30930E-02 |
| A8 | 2.76090E-02 | 3.36730E-02 |
| A10 | -7.06690E-02 | -7.83250E-02 |
| A12 | 1.46200E-03 | 1.45050E-02 |
| A16 | — | 9.58700E-03 |
| A18 | — | -9.12000E-03 |

TABLE 4-continued

Numeric value working example 2

| Aspheric coefficient | Surface number | | |
|---|---|---|---|
| | Third surface | Fourth surface | Fifth surface |
| K | 1.00000E+01 | −1.44739E−01 | 8.24700E−02 |
| A3 | −8.82700E−03 | 1.12330E−02 | 7.72700E−03 |
| A4 | −1.71270E−02 | −1.89590E−02 | 6.68520E−02 |
| A5 | −1.26200E−03 | 6.63020E−02 | −6.73410E−02 |
| A6 | 1.40330E−02 | −2.63220E−02 | 1.24940E−02 |
| A7 | 4.60660E−02 | −3.74540E−02 | 6.73300E−03 |
| A8 | 7.76340E−02 | 4.30080E−02 | −1.73800E−03 |
| A9 | −5.09370E−02 | 3.48810E−02 | 1.91000E−03 |
| A10 | −1.67430E−02 | −2.20980E−02 | −3.67000E−03 |

| Aspheric coefficient | Surface number | | |
|---|---|---|---|
| | Sixth surface | Seventh surface | Eighth surface |
| K | −3.50499E+00 | −1.00000E+01 | −6.73116E+00 |
| A3 | −3.08800E−03 | −3.04990E−02 | 3.70720E−02 |
| A4 | −6.46410E−02 | −1.88817E−01 | −2.38265E−01 |
| A5 | 8.71650E−02 | 7.43020E−02 | 1.77311E−01 |
| A6 | −1.21029E−01 | −8.98800E−03 | −4.59150E−02 |
| A7 | 6.98150E−02 | 1.63920E−02 | −1.18960E−02 |
| A8 | −1.21400E−03 | 6.76000E−04 | 9.19900E−03 |
| A9 | 8.78900E−03 | −4.96600E−03 | −1.16500E−03 |
| A10 | −7.18500E−03 | 1.08800E−03 | −1.63000E−04 |

Figure 4:
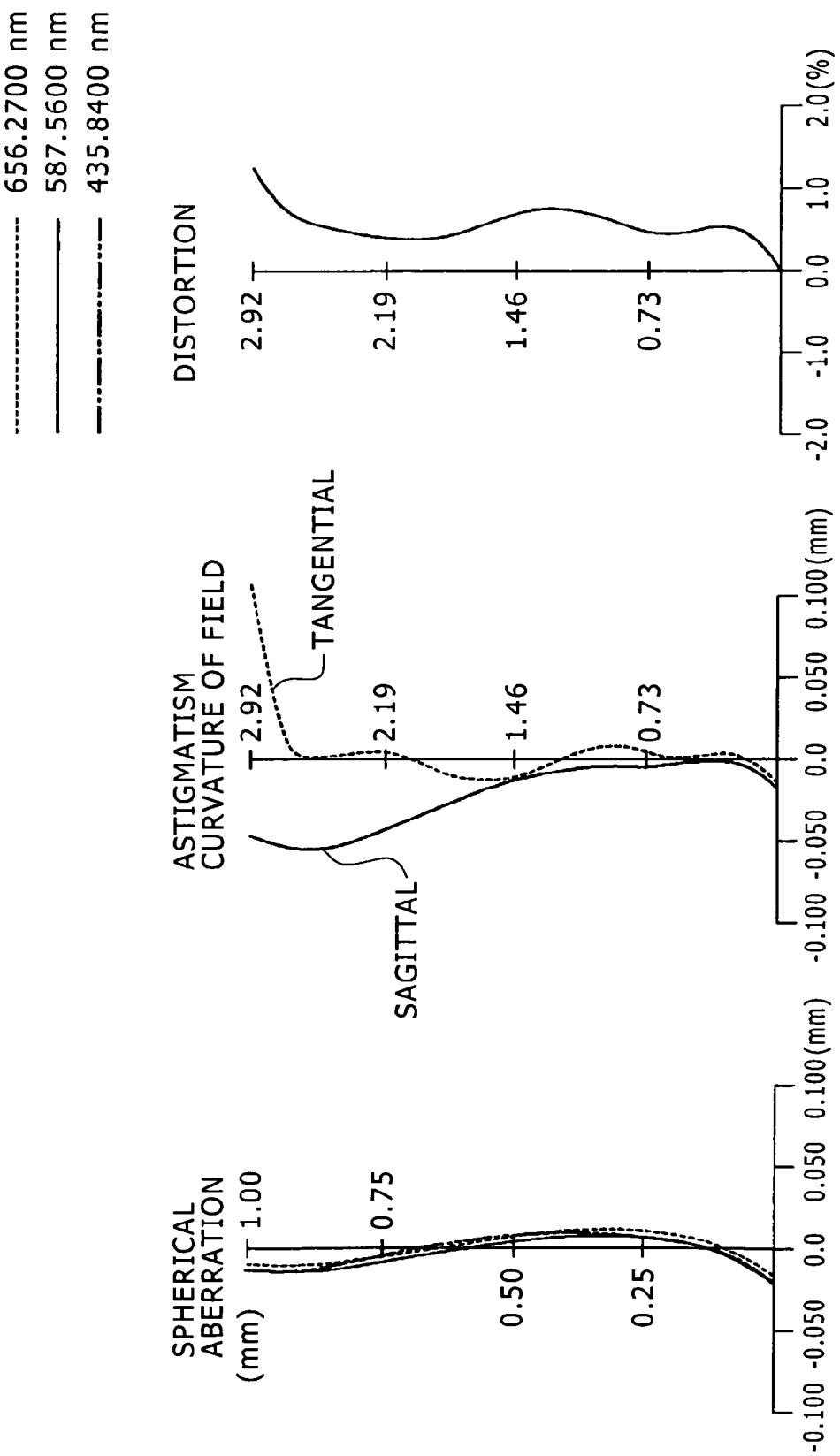
FIG. 4 is a diagram showing spherical aberration, astigmatism, and distortion of a numeric value working example in which specific numeric values are applied to the second embodiment.

FIG. 4 shows a spherical aberration diagram, an astigmatism diagram, and a distortion diagram of numeric value working example 2.

Referring to FIG. 4, in the spherical aberration diagram, the values regarding g-ray (wavelength is 435.8400 nm), d-ray (wavelength is 587.5600 nm), and c-ray (wavelength is 656.2700 nm) are indicated by the two-dot chain line, the solid line, and the dotted line, respectively. In the astigmatism diagram, the value in the sagittal image plane is indicated by the solid line and the value in the meridional image plane is indicated by the dotted line.

From the respective aberration diagrams, it is apparent that numeric value working example 2 achieves favorable correction of the respective aberrations and has excellent image forming performance.

<Third Embodiment>

Figure 5:
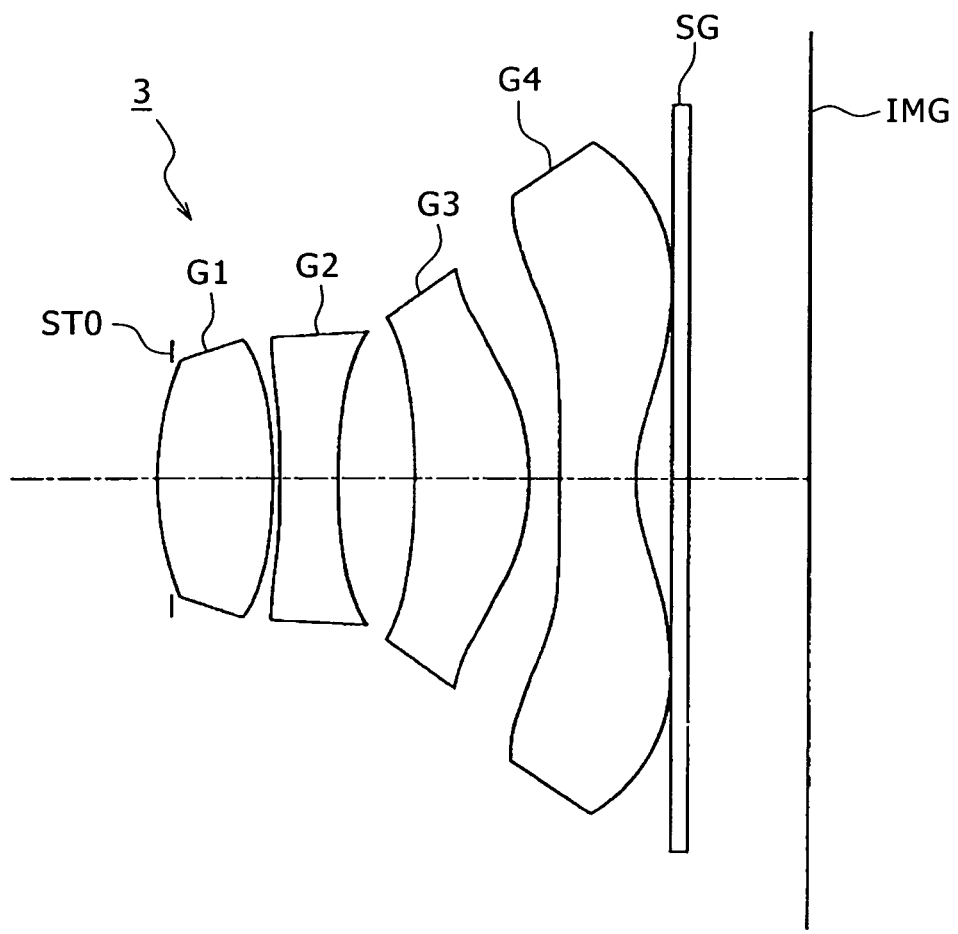
FIG. 5 is a diagram showing the lens configuration of an imaging lens according to a third embodiment of the present disclosure.

FIG. 5 shows the lens configuration of an imaging lens 3 in a third embodiment of the present disclosure.

The imaging lens 3 is formed by disposing an aperture stop STO, a first lens G1 having positive refractive power, a second lens G2 having negative refractive power, a third lens G3 having positive refractive power, and a fourth lens G4 having negative refractive power in that order from the object side toward the image side.

The surfaces of the first lens G1 near the optical axis are formed into a bi-convex shape. The first lens G1 is formed of e.g. a resin material or a glass material having a refractive index equal to or higher than 1.5 and an Abbe number equal to or larger than 56.

The surfaces of the second lens G2 near the optical axis are formed into a bi-concave shape. The second lens G2 is formed of e.g. a resin material or a glass material having a refractive index equal to or higher than 1.6 and an Abbe number equal to or smaller than 26. Furthermore, the radius of curvature of the image-side surface is set smaller than the radius of curvature of the object-side surface.

The surfaces of the third lens G3 near the optical axis are so formed as to be concave toward the object side and convex toward the image side. The third lens G3 is formed of e.g. a resin material having a refractive index equal to or higher than 1.5 and an Abbe number equal to or larger than 56, and has an inflection point in the effective diameter of the image-side surface.

The surfaces of the fourth lens G4 near the optical axis are so formed as to be convex toward the object side and concave toward the image side. The fourth lens G4 is formed of e.g. a resin material having a refractive index equal to or higher than 1.5 and an Abbe number equal to or larger than 56, and has an inflection point in each of the effective diameter of the object-side surface and the effective diameter of the image-side surface.

A seal glass SG is disposed between the fourth lens G4 and an image plane IMG.

Lens data of numeric value working example 3 in which specific numeric values are applied to the imaging lens 3 of the third embodiment are shown in Table 5.

TABLE 5

Numeric value working example 3

| Si Surface number | Ri Radius of curvature | Di Distance | Ndi Refractive index | vdi Abbe number |
|---|---|---|---|---|
| 0 (STO) | — | −0.1 | | |
| 1 | 1.84752 | 0.800 | 1.535 | 56.3 |
| 2 | −2.42745 | 0.040 | | |
| 3 | −4.35530 | 0.388 | 1.614 | 25.6 |
| 4 | 3.29994 | 0.530 | | |
| 5 | −3.93086 | 0.820 | 1.535 | 56.3 |
| 6 | −1.06343 | 0.206 | | |
| 7 | 8.56568 | 0.510 | 1.535 | 56.3 |
| 8 | 1.01004 | 0.240 | | |
| 9 | ∞ | 0.1 | 1.52 | 64.2 |
| 10 | ∞ | 0.869 | | |

In the imaging lens 3, aspheric surfaces are formed as both surfaces of the first lens G1 (first surface, second surface), both surfaces of the second lens G2 (third surface, fourth surface), both surfaces of the third lens G3 (fifth surface, sixth surface), and both surfaces of the fourth lens G4 (seventh surface, eighth surface). The aspheric coefficients of the aspheric surfaces in numeric value working example 3 are shown in Table 6 together with the conic constant K.

TABLE 6

Numeric value working example 3

| Aspheric coefficient | Surface number | |
|---|---|---|
| | First surface | Second surface |
| K | 5.60900E−03 | 5.41110E−01 |
| A4 | −2.78490E−02 | −2.06830E−02 |
| A6 | −5.06890E−02 | 1.94000E−04 |
| A8 | 2.82260E−02 | 2.80070E−02 |
| A10 | −7.72740E−02 | −6.75560E−02 |
| A12 | 2.39300E−03 | 6.47100E−03 |
| A16 | — | 9.58800E−03 |
| A18 | — | −9.11900E−03 |

| Aspheric coefficient | Surface number | | |
|---|---|---|---|
| | Third surface | Fourth surface | Fifth surface |
| K | −8.54310E−01 | 2.52443E−01 | 3.75366E+00 |
| A3 | 6.41100E−03 | 8.93600E−03 | 8.54900E−03 |
| A4 | −2.43070E−02 | −1.29910E−02 | 5.88530E−02 |
| A5 | 3.41400E−03 | 5.61660E−02 | −7.42010E−02 |
| A6 | 2.30790E−02 | −2.46410E−02 | 1.03380E−02 |
| A7 | 4.81850E−02 | −3.19440E−02 | 8.41100E−03 |
| A8 | 7.21550E−02 | 4.91170E−02 | 3.24000E−04 |

TABLE 6-continued

| | Numeric value working example 3 | | |
|---|---|---|---|
| A9 | −5.76300E−02 | 3.77170E−02 | 7.54000E−04 |
| A10 | −1.53340E−02 | −2.35950E−02 | −1.07220E−02 |
| Aspheric | Surface number | | |
| coefficient | Sixth surface | Seventh surface | Eighth surface |
| K | −3.80011E+00 | −1.00000E+01 | −6.04043E+00 |
| A3 | −3.08800E−03 | −4.39750E−02 | 1.88120E−02 |
| A4 | −6.12870E−02 | −1.60830E−01 | −2.11968E−01 |
| A5 | 8.78730E−02 | 7.29260E−02 | 1.66538E−01 |
| A6 | −1.21231E−01 | −1.15810E−02 | −4.35070E−02 |
| A7 | 6.89910E−02 | 1.60320E−02 | −1.12070E−02 |
| A8 | −1.88600E−03 | 4.46000E−04 | 8.63000E−03 |
| A9 | 1.25120E−02 | −5.08100E−03 | −1.61500E−03 |
| A10 | −9.19600E−03 | 1.12000E−03 | 6.60000E−05 |

Figure 6:
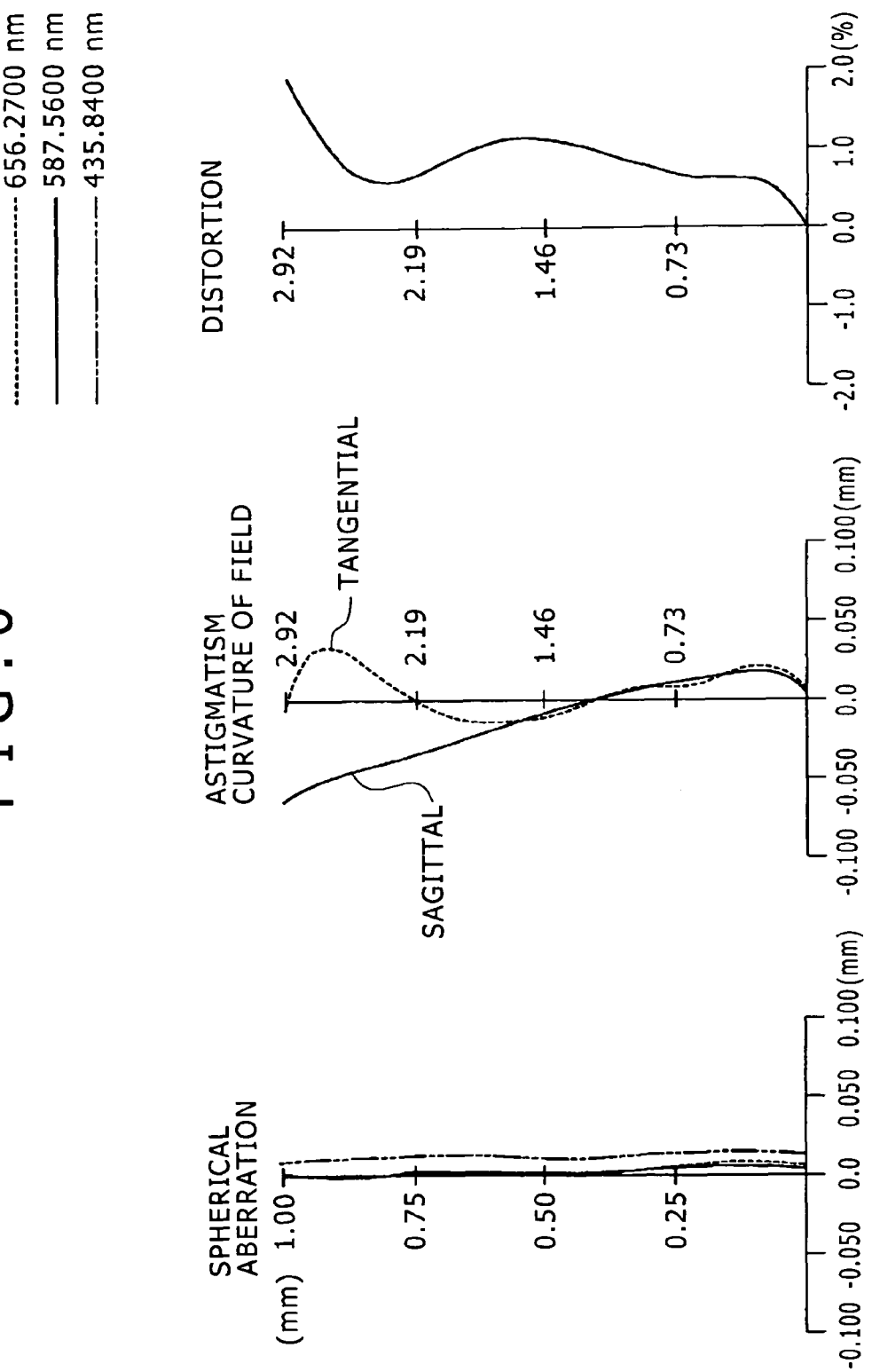
FIG. 6 is a diagram showing spherical aberration, astigmatism, and distortion of a numeric value working example in which specific numeric values are applied to the third embodiment.

FIG. 6 shows a spherical aberration diagram, an astigmatism diagram, and a distortion diagram of numeric value working example 3.

Referring to FIG. 6, in the spherical aberration diagram, the values regarding g-ray (wavelength is 435.8400 nm), d-ray (wavelength is 587.5600 nm), and c-ray (wavelength is 656.2700 nm) are indicated by the two-dot chain line, the solid line, and the dotted line, respectively. In the astigmatism diagram, the value in the sagittal image plane is indicated by the solid line and the value in the meridional image plane is indicated by the dotted line.

From the respective aberration diagrams, it is apparent that numeric value working example 3 achieves favorable correction of the respective aberrations and has excellent image forming performance.

<Fourth Embodiment>

Figure 7:
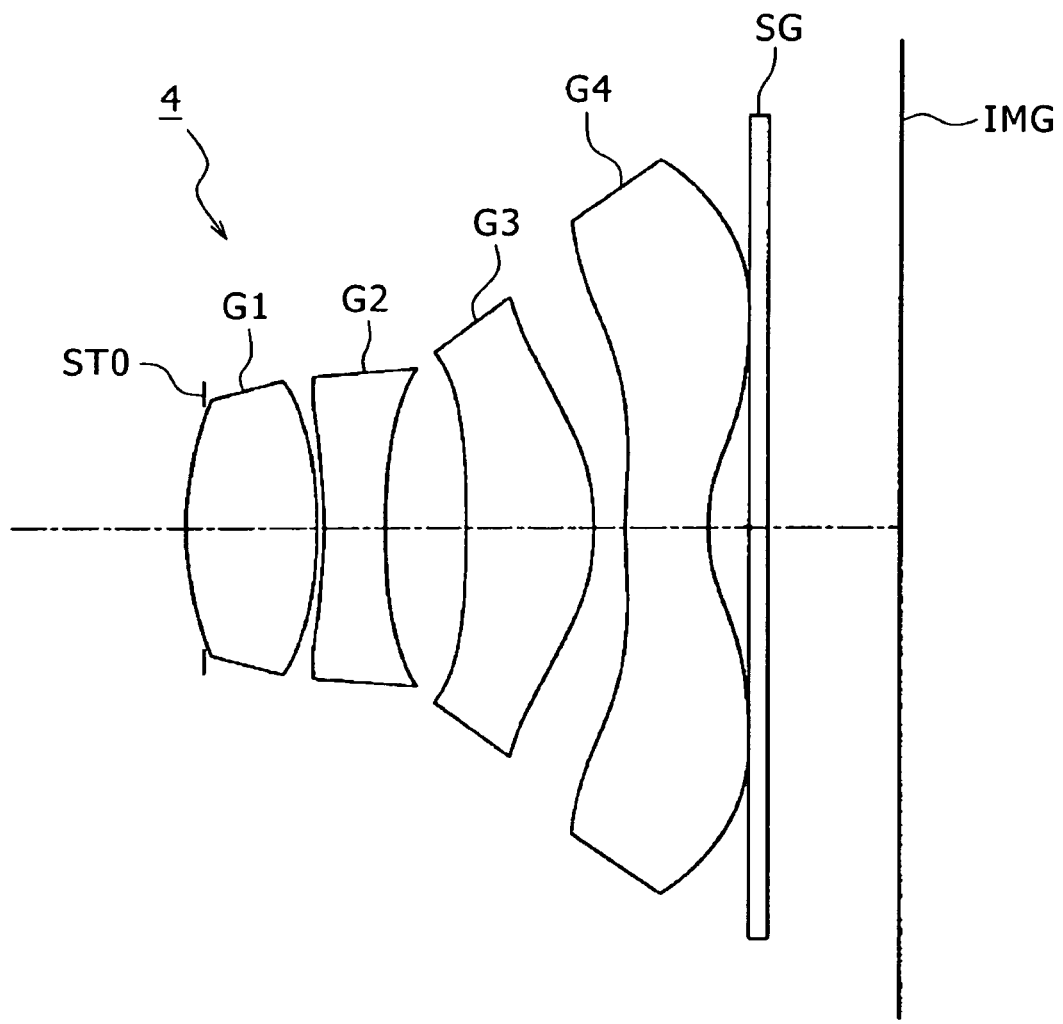
FIG. 7 is a diagram showing the lens configuration of an imaging lens according to a fourth embodiment of the present disclosure.

FIG. 7 shows the lens configuration of an imaging lens 4 in a fourth embodiment of the present disclosure.

The imaging lens 4 is formed by disposing an aperture stop STO, a first lens G1 having positive refractive power, a second lens G2 having negative refractive power, a third lens G3 having positive refractive power, and a fourth lens G4 having negative refractive power in that order from the object side toward the image side.

The surfaces of the first lens G1 near the optical axis are formed into a bi-convex shape. The first lens G1 is formed of e.g. a resin material or a glass material having a refractive index equal to or higher than 1.5 and an Abbe number equal to or larger than 56.

The surfaces of the second lens G2 near the optical axis are formed into a bi-concave shape. The second lens G2 is formed of e.g. a resin material or a glass material having a refractive index equal to or higher than 1.6 and an Abbe number equal to or smaller than 26. Furthermore, the radius of curvature of the image-side surface is set smaller than the radius of curvature of the object-side surface.

The surfaces of the third lens G3 near the optical axis are so formed as to be concave toward the object side and convex toward the image side. The third lens G3 is formed of e.g. a resin material having a refractive index equal to or higher than 1.5 and an Abbe number equal to or larger than 56, and has an inflection point in the effective diameter of the image-side surface.

The surfaces of the fourth lens G4 near the optical axis are so formed as to be convex toward the object side and concave toward the image side. The fourth lens G4 is formed of e.g. a resin material having a refractive index equal to or higher than 1.5 and an Abbe number equal to or larger than 56, and has an inflection point in each of the effective diameter of the object-side surface and the effective diameter of the image-side surface.

A seal glass SG is disposed between the fourth lens G4 and an image plane IMG.

Lens data of numeric value working example 4 in which specific numeric values are applied to the imaging lens 4 of the fourth embodiment are shown in Table 7.

TABLE 7

| | Numeric value working example 4 | | | |
|---|---|---|---|---|
| Si Surface number | Ri Radius of curvature | Di Distance | Ndi Refractive index | νdi Abbe number |
| 0 (STO) | — | −0.1 | | |
| 1 | 1.88771 | 0.723 | 1.535 | 56.3 |
| 2 | −3.05145 | 0.040 | | |
| 3 | −6.58959 | 0.484 | 1.614 | 25.6 |
| 4 | 2.98370 | 0.527 | | |
| 5 | −4.71345 | 0.766 | 1.535 | 56.3 |
| 6 | −1.05420 | 0.209 | | |
| 7 | 10.33527 | 0.510 | 1.535 | 56.3 |
| 8 | 1.04347 | 0.270 | | |
| 9 | ∞ | 0.1 | 1.52 | 64.2 |
| 10 | ∞ | 0.874 | | |

In the imaging lens 4, aspheric surfaces are formed as both surfaces of the first lens G1 (first surface, second surface), both surfaces of the second lens G2 (third surface, fourth surface), both surfaces of the third lens G3 (fifth surface, sixth surface), and both surfaces of the fourth lens G4 (seventh surface, eighth surface). The aspheric coefficients of the aspheric surfaces in numeric value working example 4 are shown in Table 8 together with the conic constant K.

TABLE 8

| | Numeric value working example 4 | |
|---|---|---|
| Aspheric | Surface number | |
| coefficient | First surface | Second surface |
| K | 1.09100E−01 | 9.41850E−01 |
| A4 | −2.49980E−02 | −2.06880E−02 |
| A6 | −4.92960E−02 | 7.21300E−03 |
| A8 | 3.17570E−02 | 2.87250E−02 |
| A10 | −7.08530E−02 | −6.91080E−02 |
| A12 | 1.05410E−02 | 9.13700E−03 |
| A16 | — | 6.36000E−03 |
| A18 | — | −9.11900E−03 |
| Aspheric | Surface number | | |
| coefficient | Third surface | Fourth surface | Fifth surface |
| K | 1.44290E+00 | 1.20821E−01 | 4.13182E+00 |
| A3 | 8.90200E−03 | 7.99700E−03 | −5.58500E−03 |
| A4 | −2.41840E−02 | −1.40850E−02 | 6.00080E−02 |
| A5 | 2.27700E−03 | 5.54240E−02 | −6.84040E−02 |
| A6 | 2.13090E−02 | −2.69180E−02 | 1.37210E−02 |
| A7 | 4.71660E−02 | −3.46780E−02 | 8.12000E−03 |
| A8 | 7.11780E−02 | 4.66180E−02 | −1.60300E−03 |
| A9 | −5.93580E−02 | 3.58660E−02 | 9.50000E−05 |
| A10 | −1.88410E−02 | −2.41260E−02 | −7.91200E−03 |
| Aspheric | Surface number | | |
| coefficient | Sixth surface | Seventh surface | Eighth surface |
| K | −3.62423E+00 | −1.00000E+01 | −6.77948E+00 |
| A3 | −3.08800E−03 | −3.01910E−02 | 4.51740E−02 |
| A4 | −6.52850E−02 | −1.62333E−01 | −2.27122E−01 |

TABLE 8-continued

| Numeric value working example 4 | | | |
|---|---|---|---|
| A5 | 8.67360E−02 | 7.21650E−02 | 1.65611E−01 |
| A6 | −1.20759E−01 | −1.20870E−02 | −4.21820E−02 |
| A7 | 6.96870E−02 | 1.60390E−02 | −1.07240E−02 |
| A8 | −1.49700E−03 | 4.15000E−04 | 8.52200E−03 |
| A9 | 1.24350E−02 | −5.03700E−03 | −1.64900E−03 |

Figure 8:
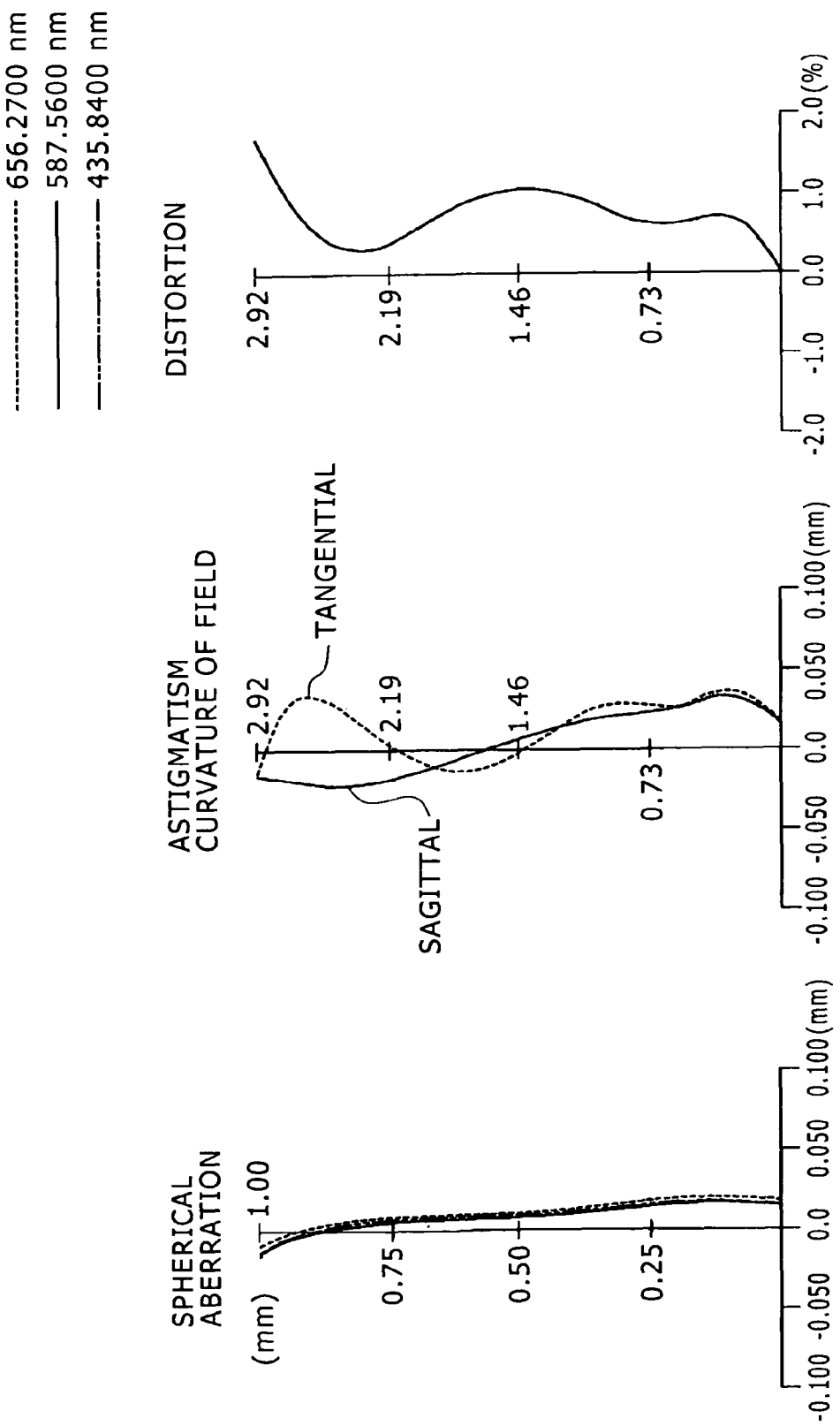
FIG. 8 is a diagram showing spherical aberration, astigmatism, and distortion of a numeric value working example in which specific numeric values are applied to the fourth embodiment.

FIG. 8 shows a spherical aberration diagram, an astigmatism diagram, and a distortion diagram of numeric value working example 4.

Referring to FIG. 8, in the spherical aberration diagram, the values regarding g-ray (wavelength is 435.8400 nm), d-ray (wavelength is 587.5600 nm), and c-ray (wavelength is 656.2700 nm) are indicated by the two-dot chain line, the solid line, and the dotted line, respectively. In the astigmatism diagram, the value in the sagittal image plane is indicated by the solid line and the value in the meridional image plane is indicated by the dotted line.

From the respective aberration diagrams, it is apparent that numeric value working example 4 achieves favorable correction of the respective aberrations and has excellent image forming performance.

<Fifth Embodiment>

Figure 9:
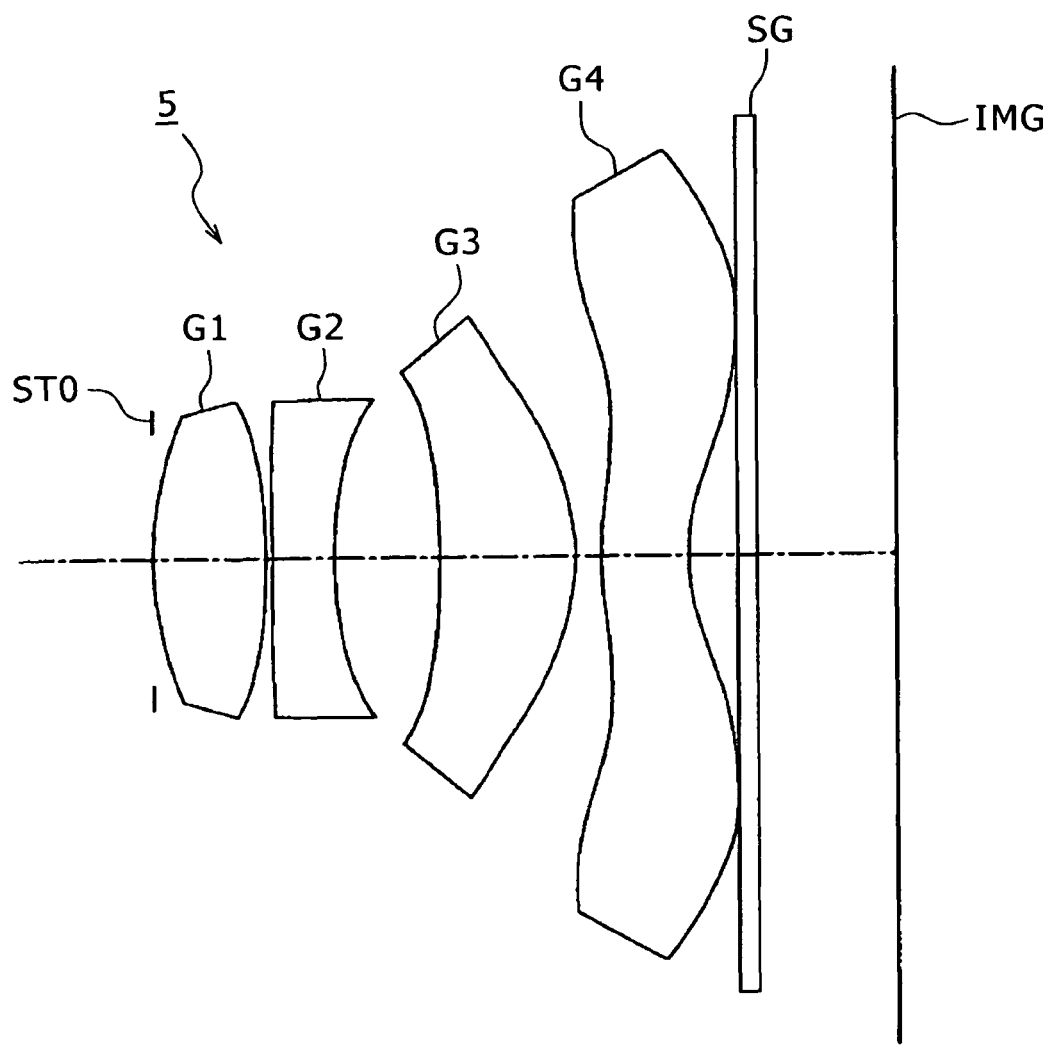
FIG. 9 is a diagram showing the lens configuration of an imaging lens according to a fifth embodiment of the present disclosure.

FIG. 9 shows the lens configuration of an imaging lens 5 in a fifth embodiment of the present disclosure.

The imaging lens 5 is formed by disposing an aperture stop STO, a first lens G1 having positive refractive power, a second lens G2 having negative refractive power, a third lens G3 having positive refractive power, and a fourth lens G4 having negative refractive power in that order from the object side toward the image side.

The surfaces of the first lens G1 near the optical axis are formed into a bi-convex shape. The first lens G1 is formed of e.g. a resin material or a glass material having a refractive index equal to or higher than 1.5 and an Abbe number equal to or larger than 56.

The surfaces of the second lens G2 near the optical axis are formed into a bi-concave shape. The second lens G2 is formed of e.g. a resin material or a glass material having a refractive index equal to or higher than 1.6 and an Abbe number equal to or smaller than 26. Furthermore, the radius of curvature of the image-side surface is set smaller than the radius of curvature of the object-side surface.

The surfaces of the third lens G3 near the optical axis are so formed as to be concave toward the object side and convex toward the image side. The third lens G3 is formed of e.g. a resin material having a refractive index equal to or higher than 1.5 and an Abbe number equal to or larger than 56, and has an inflection point in the effective diameter of the image-side surface.

The surfaces of the fourth lens G4 near the optical axis are so formed as to be convex toward the object side and concave toward the image side. The fourth lens G4 is formed of e.g. a resin material having a refractive index equal to or higher than 1.5 and an Abbe number equal to or larger than 56, and has an inflection point in each of the effective diameter of the object-side surface and the effective diameter of the image-side surface.

A seal glass SG is disposed between the fourth lens G4 and an image plane IMG.

Lens data of numeric value working example 5 in which specific numeric values are applied to the imaging lens 5 of the fifth embodiment are shown in Table 9.

TABLE 9

| Numeric value working example 5 | | | | |
|---|---|---|---|---|
| Si Surface number | Ri Radius of curvature | Di Distance | Ndi Refractive index | νdi Abbe number |
| 0 (STO) | — | −0.1 | | |
| 1 | 1.82330 | 0.693 | 1.535 | 56.3 |
| 2 | −4.12880 | 0.040 | | |
| 3 | −500.00000 | 0.358 | 1.614 | 25.6 |
| 4 | 2.47578 | 0.640 | | |
| 5 | −3.28490 | 0.825 | 1.535 | 56.3 |
| 6 | −1.30941 | 0.168 | | |
| 7 | 1.91030 | 0.510 | 1.535 | 56.3 |
| 8 | 0.86879 | 0.320 | | |
| 9 | ∞ | 0.1 | 1.52 | 64.2 |
| 10 | ∞ | 0.869 | | |

In the imaging lens 5, aspheric surfaces are formed as both surfaces of the first lens G1 (first surface, second surface), both surfaces of the second lens G2 (third surface, fourth surface), both surfaces of the third lens G3 (fifth surface, sixth surface), and both surfaces of the fourth lens G4 (seventh surface, eighth surface). The aspheric coefficients of the aspheric surfaces in numeric value working example 5 are shown in Table 10 together with the conic constant K.

TABLE 10

| Numeric value working example 5 | | |
|---|---|---|
| Aspheric coefficient | Surface number | |
| | First surface | Second surface |
| K | 3.83140E−02 | 1.00000E+01 |
| A4 | −2.75780E−02 | −4.53180E−02 |
| A6 | −5.00310E−02 | −5.56100E−03 |
| A8 | 3.10350E−02 | 2.94650E−02 |
| A10 | −7.19970E−02 | −6.74440E−02 |
| A12 | −1.70140E−02 | 7.20400E−03 |
| A16 | — | 5.23600E−03 |
| A18 | — | −9.12700E−03 |

| Aspheric coefficient | Surface number | | |
|---|---|---|---|
| | Third surface | Fourth surface | Fifth surface |
| K | 1.00000E+01 | 5.90760E−02 | 5.87537E+00 |
| A3 | 1.36400E−03 | 1.21460E−02 | 4.23280E−02 |
| A4 | −3.81690E−02 | −1.24960E−02 | 4.73810E−02 |
| A5 | −9.94200E−03 | 5.07160E−02 | −8.22260E−02 |
| A6 | 1.03720E−02 | −2.83420E−02 | 1.24710E−02 |
| A7 | 3.89500E−02 | −2.95830E−02 | 1.59070E−02 |
| A8 | 6.83840E−02 | 5.49340E−02 | 7.59600E−03 |
| A9 | −5.49370E−02 | 3.99890E−02 | 4.04400E−03 |
| A10 | −4.69600E−03 | −3.24430E−02 | −1.34240E−02 |

| Aspheric coefficient | Surface number | | |
|---|---|---|---|
| | Sixth surface | Seventh surface | Eighth surface |
| K | −3.19101E+00 | −1.00000E+01 | −3.55669E+00 |
| A3 | −2.07200E−03 | −5.11300E−02 | −4.86180E−02 |
| A4 | −6.05300E−02 | −1.63644E−01 | −1.71256E−01 |
| A5 | 8.44970E−02 | 7.54410E−02 | 1.60526E−01 |
| A6 | −1.26169E−01 | −1.18740E−02 | −4.43710E−02 |
| A7 | 6.52310E−02 | 1.58440E−02 | −1.14980E−02 |
| A8 | −3.53900E−03 | 3.14000E−04 | 8.62900E−03 |
| A9 | 1.25070E−02 | −5.09100E−03 | −1.61400E−03 |
| A10 | −8.25800E−03 | 1.18300E−03 | 1.24000E−04 |

Figure 10:
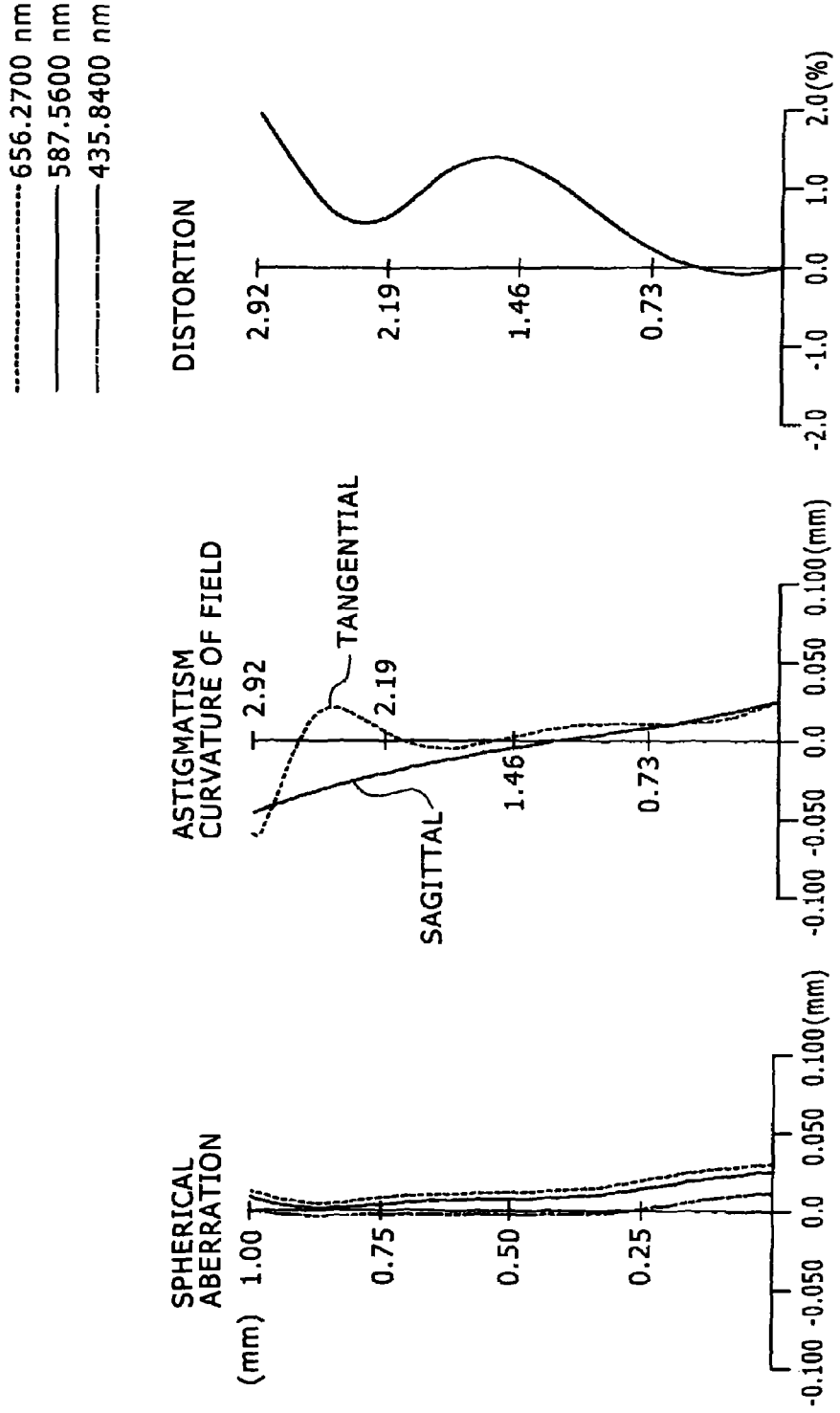
FIG. 10 is a diagram showing spherical aberration, astigmatism, and distortion of a numeric value working example in which specific numeric values are applied to the fifth embodiment.

FIG. 10 shows a spherical aberration diagram, an astigmatism diagram, and a distortion diagram of numeric value working example 5.

Referring to FIG. 10, in the spherical aberration diagram, the values regarding g-ray (wavelength is 435.8400 nm), d-ray (wavelength is 587.5600 nm), and c-ray (wavelength is 656.2700 nm) are indicated by the two-dot chain line, the solid line, and the dotted line, respectively. In the astigmatism diagram, the value in the sagittal image plane is indicated by the solid line and the value in the meridional image plane is indicated by the dotted line.

From the respective aberration diagrams, it is apparent that numeric value working example 5 achieves favorable correction of the respective aberrations and has excellent image forming performance.

[Respective Values of Condition Expressions of Imaging Lenses]

Table 11 shows the respective values of condition expressions (1) to (5) in the imaging lenses 1 to 5.

TABLE 11

| | | Numeric value working example 1 | Numeric value working example 2 | Numeric value working example 3 | Numeric value working example 4 | Numeric value working example 5 |
|---|---|---|---|---|---|---|
| | f2 | −3.946 | −3.391 | −2.971 | −3.250 | −3.973 |
| | f | 3.689 | 3.679 | 3.657 | 3.651 | 3.650 |
| Condition expression (1) | f2/f | −1.07 | −0.92 | −0.81 | −0.89 | −1.09 |
| | f1 | 2.582 | 2.306 | 2.091 | 2.289 | 2.456 |
| Condition expression (2) | f2/f1 | −1.53 | −1.47 | −1.42 | −1.42 | −1.62 |
| | f3 | 2.429 | 2.384 | 2.469 | 2.357 | 3.539 |
| Condition expression (3) | f3/f | 0.66 | 0.65 | 0.68 | 0.65 | 0.97 |
| | R4 | 2.935 | 2.591 | 3.300 | 2.984 | 2.476 |
| Condition expression (4) | R4/f | 0.80 | 0.70 | 0.90 | 0.82 | 0.68 |
| | L | 4.609 | 4.506 | 4.500 | 4.503 | 4.500 |
| | Y | 2.921 | 2.921 | 2.921 | 2.921 | 2.921 |
| Condition expression (5) | L/Y | 1.58 | 1.54 | 1.54 | 1.54 | 1.54 |
| | Fno | 2.44 | 2.47 | 2.46 | 2.45 | 2.45 |

As is apparent from Table 11, the imaging lenses 1 to 5 satisfy condition expressions (1) to (5).

[Configuration of Imaging Device]

An imaging device according to an embodiment of the present disclosure includes an imaging lens and an imaging element that converts an optical image formed by the imaging lens to an electrical signal. The imaging lens is formed by disposing an aperture stop, a first lens, a second lens, a third lens, and a fourth lens sequentially from the object side toward the image side.

The first lens has positive refractive power. The second lens has negative refractive power and the surfaces of the second lens near the optical axis have a bi-concave shape. The third lens has positive refractive power and the object-side surface of the third lens near the optical axis is concave toward the object side. The fourth lens has negative refractive power and the object-side surface of the fourth lens near the optical axis is convex toward the object side.

Furthermore, in the imaging lens in the imaging device according to an embodiment of the present disclosure, both surfaces of the first lens, both surfaces of the second lens, both surfaces of the third lens, and both surfaces of the fourth lens are formed as aspheric surfaces.

Moreover, the imaging device according to an embodiment of the present disclosure satisfies the following condition expression (1), condition expression (2), and condition expression (3).

$$-1.09 \leq f2/f \leq -0.81 \quad (1)$$

$$-1.62 \leq f2/f1 \leq -1.42 \quad (2)$$

$$0.65 \leq f3/f \leq 0.97 \quad (3)$$

In these expressions, the parameters are defined as follows.
f1: the focal length of the first lens
f2: the focal length of the second lens
f3: the focal length of the third lens
f: the focal length of the lens whole system Condition expression (1) is an expression that defines the ratio of the focal length of the second lens having negative refractive power to the focal length of the lens whole system.

If this ratio surpasses the upper limit of condition expression (1), the Petzval sum becomes too small and the image plane tilts toward the under-corrected side excessively.

Conversely, if this ratio is under the lower limit of condition expression (1), the Petzval sum becomes too large and the image plane tilts toward the over-corrected side excessively.

Condition expression (2) is an expression that defines the ratio of the focal length of the second lens having negative refractive power to the focal length of the first lens having positive refractive power.

If this ratio is under the lower limit of condition expression (2), correction of the axial chromatic aberration becomes excessive and the distortion increases. Furthermore, the image plane in the sagittal/tangential direction becomes too under-corrected.

Conversely, if this ratio surpasses the upper limit of condition expression (2), correction of the axial chromatic aberration becomes insufficient and the lowering of the resolution is caused.

If the imaging device satisfies condition expression (1) and condition expression (2), distribution of the focal length between the first lens having positive refractive power and the second lens having negative refractive power is properly achieved. Therefore, the axial chromatic aberration and the spherical aberration can be favorably corrected. Due to the favorable correction of the axial chromatic aberration and the spherical aberration, a high resolution can be ensured in the range to the high-frequency region even when the F-number is set small.

Condition expression (3) is an expression that defines the ratio of the focal length of the third lens having positive refractive power to the focal length of the lens whole system.

If this ratio is under the lower limit of condition expression (3), the Petzval sum becomes too small and the image plane tilts toward the under-corrected side excessively.

Conversely, if this ratio surpasses the upper limit of condition expression (3), the Petzval sum becomes too large and the image plane tilts toward the over-corrected side excessively.

If the imaging device satisfies condition expression (1), condition expression (2), and condition expression (3), distribution of the focal length among the first lens having positive refractive power, the second lens having negative refractive power, and the third lens having positive refractive power is properly achieved. Therefore, the spherical aberration and the curvature of field can be favorably corrected, and the image plane in the sagittal/tangential direction can be properly corrected.

It is also possible to set the F-number to about 2.4 by widening the aperture (diameter of the aperture stop) in an imaging optical system with about 2.8 of the F-number. However, in this case, it is difficult to ensure a high resolution due to the influence of the residual aberration. Furthermore, if the aperture is widened, correction of the astigmatism and the curvature of field in the peripheral area of the lens becomes insufficient. In particular, if correction of the astigmatism is insufficient, the effect of so-called aperture control, in which the resolution is adjusted by image processing, differs between the tangential direction and the sagittal direction. Thus, the image becomes unnatural and the deterioration of the image quality is caused.

So, it will also be effective to carry out aberration correction by forming an appropriate surface of the lens as an aspheric surface. However, if aberration correction is attempted by only the aspheric surface, possibly difficulty in molding of the lens becomes higher and the mass-productivity is lowered due to increase in the sensitivity to assembly and strain of the lens.

In contrast, the imaging device according to an embodiment of the present disclosure has design made in consideration of the manufacturability and the mass-productivity through optimization of distribution of the focal length among the respective constituent lenses and the way of use of the aspheric coefficient.

As described above, the imaging device according to an embodiment of the present disclosure satisfies condition expression (1), condition expression (2), and condition expression (3), and therefore distribution of the focal length among the first lens having positive refractive power, the second lens having negative refractive power, and the third lens having positive refractive power is properly achieved.

Accordingly, the axial chromatic aberration, the spherical aberration, and the curvature of field are favorably corrected, and a bright, high-resolution imaging device with achievement of a wider angle of view can be realized.

Specifically, the imaging device has about 2.4 of the F-number and a wide angle of view equivalent to 28 mm in 35 mm equivalent, and high resolution performance is ensured in the range to the peripheral area of the lens. For example, a sufficiently-high resolution for use as the lens of a camera of portable apparatus with 8 to 13 million pixels is ensured.

In addition, as described above, the imaging device according to an embodiment of the present disclosure achieves both of shortening of the optical total length and brightness and increase in the resolution.

Specifically, the optical total length is set to about 4.5 mm for an imaging element having a ⅓.2 size.

In general, in shortening of the optical total length, the following problems exist regarding the manufacturability and the mass-productivity.

For example, in the case of attempting to shorten the optical total length through only shortening of the lens thickness and the air gap between lenses, possibly the required shortening of the optical total length cannot be achieved because there are limits to the moldability of the lens and the accuracy of processing of the barrel to hold the lens.

Furthermore, in the case of attempting to shorten the optical total length by shortening the back focal length, possibly dust, flaw, etc. are imaged in the image and are noticeable. In addition, a cover glass and an infrared cut filter are disposed between the imaging element and the lens. Therefore, there is a limit also to the shortening of the optical total length through the shortening of the back focal length.

Moreover, for example in the case of attempting to shorten the optical total length with such a wide angle of view that the converted focal length is equivalent to 28 mm, the sectional area of a beam at a peripheral angle of view becomes small due to the cosine fourth law and vignetting. Therefore, possibly the dust imaged in the image has such a large size as to be noticeable and the size of the dust becomes the uncontrollable level.

In order to avoid the occurrence of the above-described problems, the imaging device according to an embodiment of the present disclosure is designed in consideration of sufficiently-high manufacturability and mass-productivity and achieves both of shortening of the optical total length and brightness and increase in the resolution.

[One Embodiment of Imaging Device]

One embodiment of the present disclosure in which the imaging device according to an embodiment of the present disclosure is applied to a cellular phone will be described below (refer to FIGS. 11 to 13).

Figure 11:
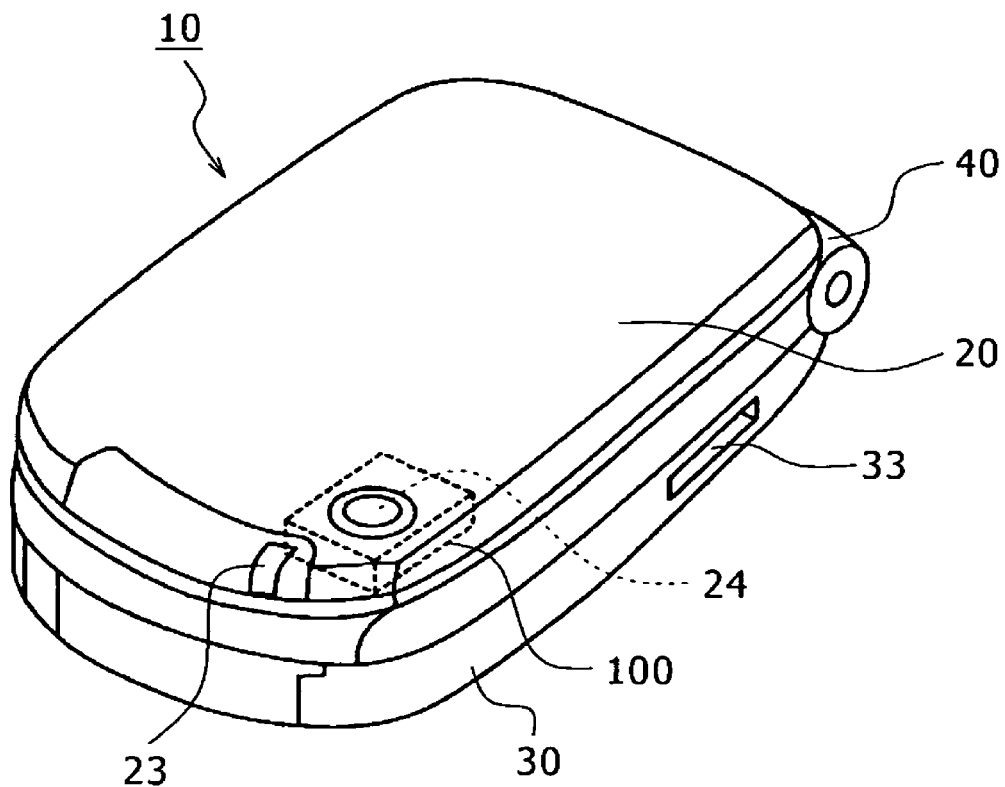
FIG. 11 is a diagram showing a cellular phone to which an imaging device according to an embodiment of the present disclosure is applied together with FIG. 12 and FIG. 13, and is a perspective view showing the closed state of the cellular phone.
Figure 12:
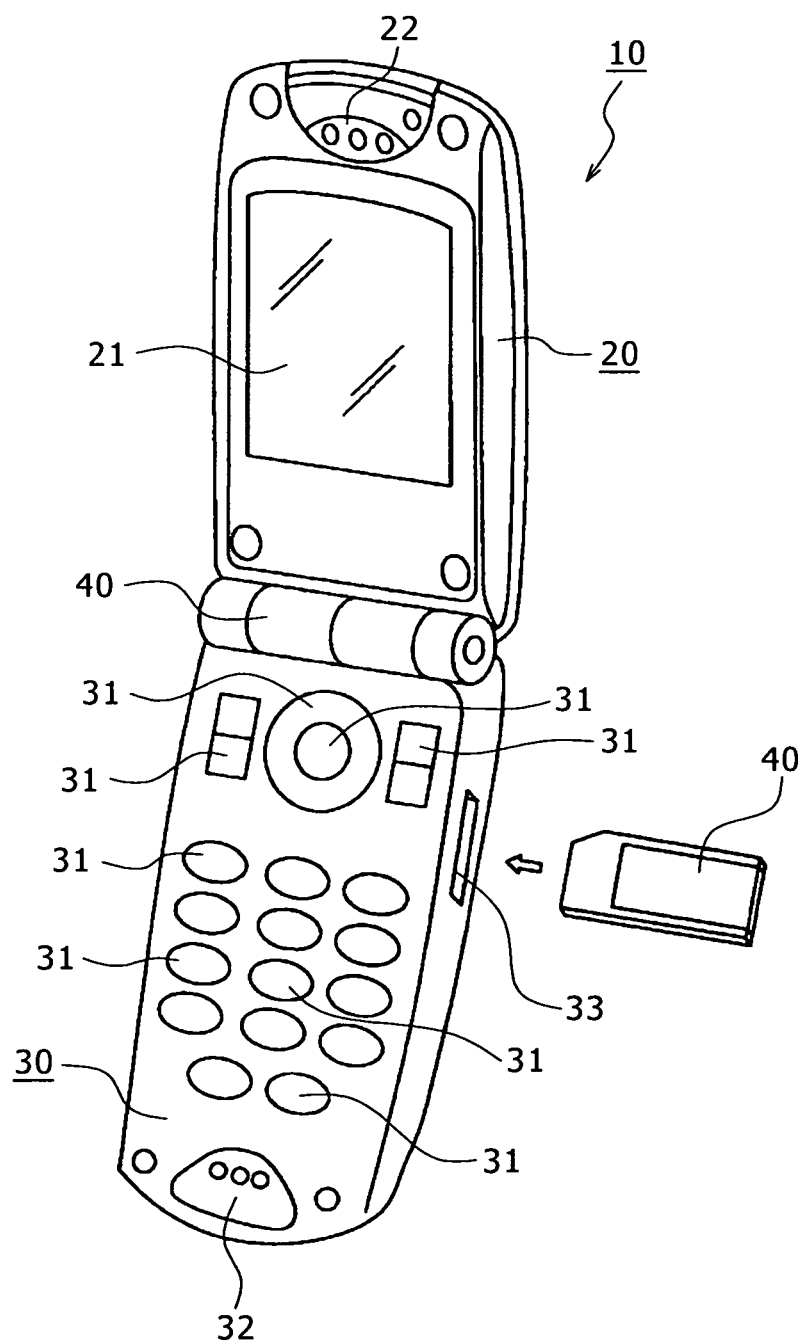
FIG. 12 is a perspective view showing the opened state of the cellular phone.

As shown in FIG. 11 and FIG. 12, in a cellular phone 10, a display part 20 and a main body part 30 are foldably connected to each other by a hinge part 40. When being carried, the cellular phone 10 is set to the state in which the display part 20 and the main body part 30 are closed through folding as shown in FIG. 11. When being used for a telephone call and so forth, the cellular phone 10 is set to the state in which the display part 20 and the main body part 30 are opened as shown in FIG. 12.

A liquid crystal display panel 21 is disposed on one surface of the display part 20, and a speaker 22 is provided above the liquid crystal display panel 21. An imaging unit 100 having the imaging lens 1, the imaging lens 2, the imaging lens 3, the imaging lens 4, or the imaging lens 5 is incorporated into the display part 20. An infrared communication unit 23 for communication by the infrared ray is provided in the display part 20.

A cover lens 24 located on the object side of the first lens G1 of the imaging unit 100 is disposed on the other surface of the display part 20.

Various kinds of operation keys 31 such as number keys and a power key are provided on one surface of the main body part 30. A microphone 32 is provided on one surface of the main body part 30. A memory card slot 33 is formed on a side surface of the main body part 30 and a memory card 40 is inserted/removed in/from the memory card slot 33.

Figure 13:
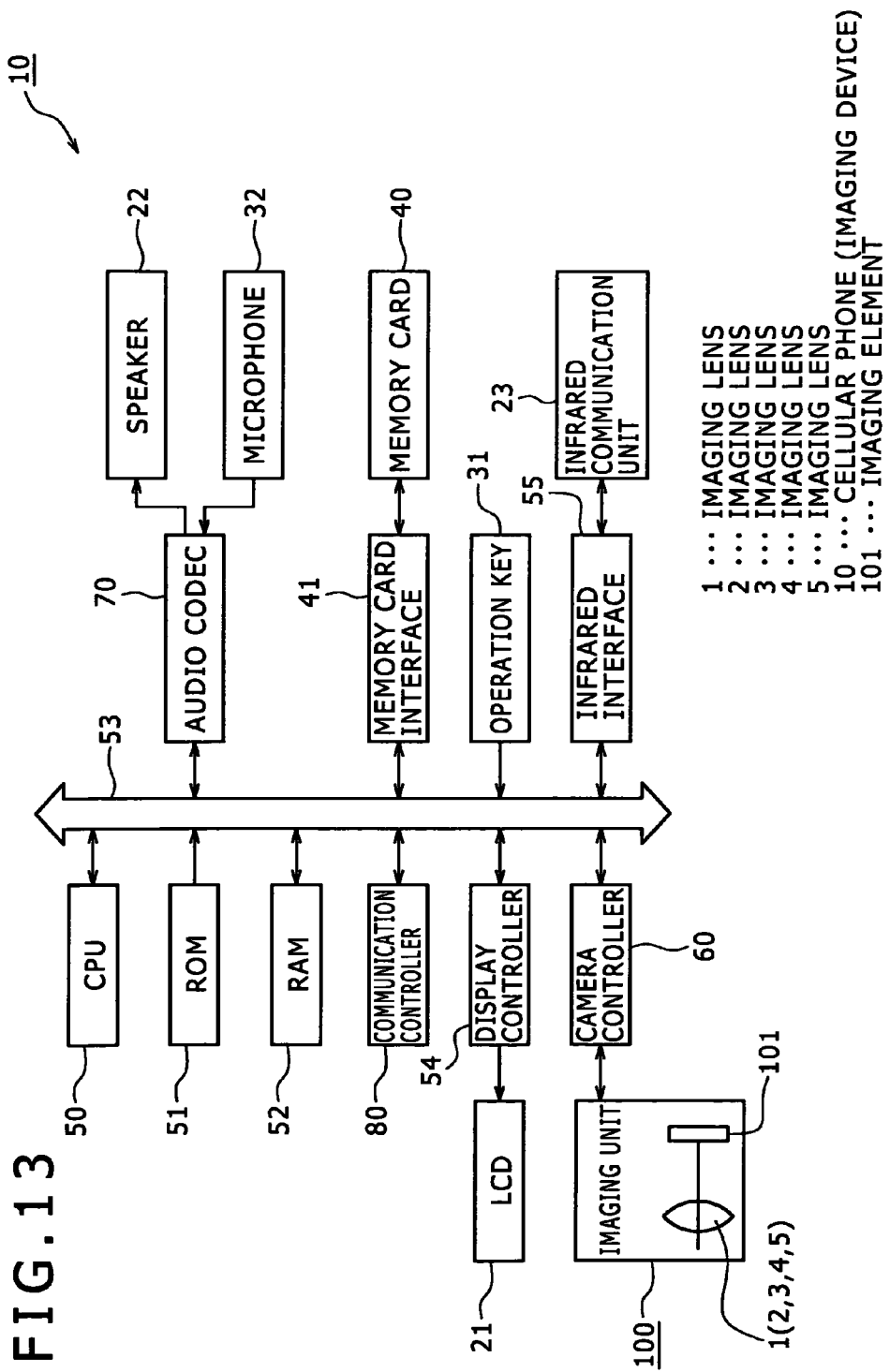
FIG. 13 is a block diagram of the cellular phone.

FIG. 13 is a block diagram showing the configuration of the cellular phone 10.

The cellular phone 10 includes a central processing unit (CPU) 50 and the operation of the whole of the cellular phone 10 is controlled by the CPU 50. For example, the CPU 50 expands a control program stored in a read only memory (ROM) 51 into a random access memory (RAM) 52, and controls the operation of the cellular phone 10 via a bus 53.

A camera controller 60 has a function to photograph still images and moving images by controlling the imaging unit 100. The camera controller 60 executes compression processing into the JPEG (Joint Photographic Experts Group), the MPEG (Moving Picture Expert Group), etc. for image information obtained by the photographing and then sends out the compressed data to the bus 53. The imaging unit 100 has an imaging element 101 such as a charge coupled device (CCD) or a complementary metal oxide semiconductor (CMOS) element in addition to the imaging lens 1, the imaging lens 2, the imaging lens 3, the imaging lens 4, or the imaging lens 5.

The image information sent out to the bus 53 is temporarily stored in the RAM 52. According to need, the image information is output to a memory card interface 41 to be stored in the memory card 40 by the memory card interface 41, or it is displayed on the liquid crystal display panel 21 via a display controller 54. Furthermore, in photographing, audio information simultaneously recorded via the microphone 32 is also temporarily stored in the RAM 52 and stored in the memory card 40 via an audio codec 70. In addition, the audio information is output from the speaker 22 via the audio coded 70 simultaneously with image displaying on the liquid crystal display panel 21.

According to need, the image information and the audio information are output to an infrared interface 55 and output to the external via the infrared communication unit 23 by the infrared interface 55 to be transmitted to another piece of apparatus having an infrared communication unit, such as a cellular phone, a personal computer, or a personal digital assistance (PDA). When a moving image or a still image is displayed on the liquid crystal display panel 21 based on image information stored in the RAM 52 or the memory card 40, image data resulting from decoding and decompression of a file stored in the RAM 52 or the memory card 40 in the camera controller 60 is sent out to the display controller 54 via the bus 53.

A communication controller 80 transmits/receives radio waves to/from a base station via an antenna (not shown) included in the display part 20. In the audio telephone call mode, the communication controller 80 processes received audio information and then outputs the processed information to the speaker 22 via the audio codec 70. Furthermore, the communication controller 80 receives audio collected by the microphone 32 via the audio coded 70 to execute predetermined processing for the audio and then transmit the audio.

In the above-described imaging lens 1, imaging lens 2, imaging lens 3, imaging lens 4, and imaging lens 5, shortening of the optical total length can be achieved as described above. Therefore, these lenses can be easily incorporated into an imaging device desired to have a smaller thickness, such as the cellular phone 10.

In the above-described embodiment, an example in which the imaging device is applied to a cellular phone is shown. However, the application range of the imaging device is not limited to the cellular phone, and the imaging device can be widely applied to various kinds of digital input/output apparatus such as digital video camcorder, digital still camera, personal computer into which a camera is incorporated, and PDA into which a camera is incorporated.

The shapes and numeric values of the respective components shown in the above-described respective embodiments are all merely one example of materialization for carrying out the present disclosure, and the technical scope of the present disclosure should not be interpreted in a limited way.

The present disclosure contains subject matter related to that disclosed in Japanese Priority Patent Application JP 2010-219962 filed in the Japan Patent Office on Sep. 29, 2010, the entire content of which is hereby incorporated by reference.

What is claimed is:

1. An imaging lens comprising:
an aperture stop;
a first lens configured to have positive refractive power;
a second lens configured to have negative refractive power, surfaces of the second lens near an optical axis having a bi-concave shape;
a third lens configured to have positive refractive power, an object-side surface of the third lens near the optical axis being concave toward an object side; and
a fourth lens configured to have negative refractive power, an object-side surface of the fourth lens near the optical axis being convex toward the object side,
wherein
the aperture stop, the first lens, the second lens, the third lens, and the fourth lens are sequentially disposed from the object side toward an image side,
both surfaces of the first lens, both surfaces of the second lens, both surfaces of the third lens, and both surfaces of the fourth lens are formed as aspheric surfaces, and
condition expression (1), condition expression (2), and condition expression (3) are satisfied:

$$-1.09 \leq f2/f \leq -0.81 \tag{1}$$

$$-1.62 \leq f2/f1 \leq -1.42 \tag{2}$$

$$0.65 \leq f3/f \leq 0.97 \tag{3}$$

in which
f1: focal length of the first lens
f2: focal length of the second lens
f3: focal length of the third lens
f: focal length of a lens whole system.

2. An imaging lens comprising:
an aperture stop;
a first lens configured to have positive refractive power;
a second lens configured to have negative refractive power, surfaces of the second lens near an optical axis having a bi-concave shape;
a third lens configured to have positive refractive power, an object-side surface of the third lens near the optical axis being concave toward an object side; and
a fourth lens configured to have negative refractive power, an object-side surface of the fourth lens near the optical axis being convex toward the object side,
wherein
the aperture stop, the first lens, the second lens, the third lens, and the fourth lens are sequentially disposed from the object side toward an image side,
both surfaces of the first lens, both surfaces of the second lens, both surfaces of the third lens, and both surfaces of the fourth lens are formed as aspheric surfaces, and
condition expression (1), condition expression (2), and condition expression (3) are satisfied:

$$-1.09 \leq f2/f \leq -0.81 \tag{1}$$

$$-1.62 \leq f2/f1 \leq -1.42 \tag{2}$$

$$0.65 \leq f3/f \leq 0.97 \tag{3}$$

in which
f1: focal length of the first lens
f2: focal length of the second lens
f3: focal length of the third lens
f: focal length of a lens whole system and
wherein
condition expression (4) is satisfied:

$$0.68 \leq R4/f \leq 0.90 \tag{4}$$

in which
R4: a radius of curvature of an image-side surface of the second lens.

3. An imaging lens comprising:
an aperture stop;
a first lens configured to have positive refractive power;
a second lens configured to have negative refractive power, surfaces of the second lens near an optical axis having a bi-concave shape;

a third lens configured to have positive refractive power, an object-side surface of the third lens near the optical axis being concave toward an object side; and a fourth lens configured to have negative refractive power, an object-side surface of the fourth lens near the optical axis being convex toward the object side, wherein the aperture stop, the first lens, the second lens, the third lens, and the fourth lens are sequentially disposed from the object side toward an image side, both surfaces of the first lens, both surfaces of the second lens, both surfaces of the third lens, and both surfaces of the fourth lens are formed as aspheric surfaces, and condition expression (1), condition expression (2), and condition expression (3) are satisfied:

$$-1.09 \leq f2/f5 \leq -0.81 \tag{1}$$

$$-1.62 \leq f2/f1 \leq -1.42 \tag{2}$$

$$0.65 \leq f3/f \leq 0.97 \tag{3}$$

in which
- f1: focal length of the first lens
- f2: focal length of the second lens
- f3: focal length of the third lens
- f: focal length of a lens whole system and wherein condition expression (5) is satisfied:

$$L/Y \leq 1.58 \tag{5}$$

in which
- L: distance from a vertex of the object-side surface of the first lens to an image plane
- Y: image height.

4. An imaging lens comprising:

an aperture stop;

a first lens configured to have positive refractive power;

a second lens configured to have negative refractive power, surfaces of the second lens near an optical axis having a bi-concave shape;

a third lens configured to have positive refractive power, an object-side surface of the third lens near the optical axis being concave toward an object side; and a fourth lens configured to have negative refractive power, an object-side surface of the fourth lens near the optical axis being convex toward the object side, wherein the aperture stop, the first lens, the second lens, the third lens, and the fourth lens are sequentially disposed from the object side toward an image side, both surfaces of the first lens, both surfaces of the second lens, both surfaces of the third lens, and both surfaces of the fourth lens are formed as aspheric surfaces, and condition expression (1), condition expression (2), and condition expression (3) are satisfied:

$$-1.09 \leq f2/f5 \leq -0.81 \tag{1}$$

$$-1.62 \leq f2/f1 \leq -1.42 \tag{2}$$

$$0.65 \leq f3/f \leq 0.97 \tag{3}$$

in which
- f1: focal length of the first lens
- f2: focal length of the second lens
- f3: focal length of the third lens
- f: focal length of a lens whole system and wherein a value of an F-number is set equal to or smaller than 2.47.

5. An imaging device comprising:

an imaging lens; and an imaging element configured to convert an optical image formed by the imaging lens to an electrical signal, wherein the imaging lens includes
- an aperture stop,
- a first lens having positive refractive power,
- a second lens having negative refractive power, surfaces of the second lens near an optical axis having a bi-concave shape,
- a third lens having positive refractive power, an object-side surface of the third lens near the optical axis being concave toward an object side, and
- a fourth lens having negative refractive power, an object-side surface of the fourth lens near the optical axis being convex toward the object side, the aperture stop, the first lens, the second lens, the third lens, and the fourth lens are sequentially disposed from the object side toward an image side, both surfaces of the first lens, both surfaces of the second lens, both surfaces of the third lens, and both surfaces of the fourth lens are formed as aspheric surfaces, and condition expression (1), condition expression (2), and condition expression (3) are satisfied:

$$-1.09 \leq f2/f5 \leq -0.81 \tag{1}$$

$$-1.62 \leq f2/f1 \leq -1.42 \tag{2}$$

$$0.65 \leq f3/f \leq 0.97 \tag{3}$$

in which
- f1: focal length of the first lens
- f2: focal length of the second lens
- f3: focal length of the third lens
- f: focal length of a lens whole system.

* * * * *